United States Patent
Sakhnini et al.

(10) Patent No.: US 11,616,671 B1
(45) Date of Patent: Mar. 28, 2023

(54) SUBCARRIER MAPPING TECHNIQUES FOR GUARD INTERVAL-BASED ORTHOGONAL FREQUENCY DIVISION MULTIPLEXING COMMUNICATIONS

(71) Applicant: QUALCOMM Incorporated, San Diego, CA (US)

(72) Inventors: Iyab Issam Sakhnini, San Diego, CA (US); Hemant Saggar, Irvine, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/572,108

(22) Filed: Jan. 10, 2022

(51) Int. Cl.
*H04L 27/26* (2006.01)
*H04L 5/00* (2006.01)

(52) U.S. Cl.
CPC ...... *H04L 27/26025* (2021.01); *H04L 5/0007* (2013.01); *H04L 5/0098* (2013.01)

(58) Field of Classification Search
CPC .......... H04L 27/2605; H04L 27/26025; H04L 27/2603; H04L 27/2608; H04L 27/2614; H04L 5/0007; H04L 1/1829; H04L 5/0094; H04L 5/0098
See application file for complete search history.

(56) References Cited

U.S. PATENT DOCUMENTS

| | | | | |
|---|---|---|---|---|
| 2004/0066740 | A1* | 4/2004 | Suh | H04L 27/262 370/208 |
| 2006/0221898 | A1* | 10/2006 | Bossert | H04B 7/0671 370/330 |
| 2007/0041457 | A1* | 2/2007 | Kadous | H04L 5/0023 375/260 |
| 2007/0258536 | A1* | 11/2007 | Kim | H04L 1/0656 375/267 |
| 2018/0375707 | A1* | 12/2018 | Bala | H04L 27/2605 |
| 2022/0166477 | A1* | 5/2022 | Zhan | H04L 27/2691 |

* cited by examiner

*Primary Examiner* — Khanh C Tran
(74) *Attorney, Agent, or Firm* — Dalei Dong; Holland & Hart LLP

(57) ABSTRACT

Methods, systems, and devices for wireless communications are described in which a user equipment (UE) or base station may generate orthogonal frequency division multiplexing (OFDM) symbols based on a permutation matrix (P) that permutes guard interval (GI) samples and data samples such that the OFDM symbols have power values across the symbols that are supportable by a transmitting device. The permutation matrix may map GI inputs to a subset of subcarriers for an OFDM communication, where the permutation matrix determined based at least in part on a first number of columns of a sub-matrix of a first matrix. The first matrix may be an inverse fast Fourier transform (IFFT) matrix, or may be a product of the IFFT matrix and a subcarrier mapping matrix. The first number of columns may correspond to a number of subcarriers that carry time-domain GI samples.

28 Claims, 19 Drawing Sheets

US 11,616,671 B1

SUBCARRIER MAPPING TECHNIQUES FOR GUARD INTERVAL-BASED ORTHOGONAL FREQUENCY DIVISION MULTIPLEXING COMMUNICATIONS

FIELD OF TECHNOLOGY

The following relates to wireless communications, including subcarrier mapping techniques for guard interval-based orthogonal frequency division multiplexing communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE and a base station may communicate in a set of transmission time intervals (TTIs). In some cases, the UE and the base station may communicate in relatively high frequency bands according to one or more different waveform types. For example, a first waveform type may support cyclic prefix-based waveforms and a second waveform type may support guard interval (GI)-based waveforms. In systems that support GI-based waveforms, the GI may include a defined sequence that may convey information or may include zero-power samples. Efficient techniques for generating and transmitting OFDM symbols using a GI-based OFDM waveform may help to enhance transmitting device operation and network efficiency.

SUMMARY

The described techniques relate to improved methods, systems, devices, and apparatuses that support subcarrier mapping techniques for guard interval (GI)-based orthogonal frequency division multiplexing (OFDM) communications. In various aspects, the described techniques provide for generation of OFDM symbols based on a permutation matrix that permutes GI samples and data samples such that the OFDM symbols have power values across the symbols that are supportable by a transmitting device such as a user equipment (UE) or base station. In some cases, the transmitting device may identify GI inputs and data inputs for an OFDM communication, and the permutation matrix maps the GI inputs to a subset of subcarriers for the OFDM communication, where the permutation matrix determined based at least in part on a first number of columns of a sub-matrix (Z) of a first matrix (K). In some cases, the first matrix (K) may be, for example, an IFFT matrix ($F_N^{-1}$), or a product of the IFFT matrix ($F_N^{-1}$) and a subcarrier mapping matrix (B) (i.e., $K=F_N^{-1}B$). The first number of columns may correspond to a number of subcarriers that carry time-domain GI samples. An OFDM symbol with the time-domain GI samples and time-domain data samples may be generated based at least in part on a product of the permutation matrix and the first matrix.

A method for wireless communication at a transmitting device is described. The method may include identifying a first set of guard interval inputs and a second set of data inputs for an OFDM communication, where the OFDM communication has a first set of time-domain guard interval samples and a second set of time-domain data samples, determining a permutation matrix to map the first set of guard interval inputs to a subset of a set of subcarriers for the OFDM communication, the permutation matrix determined based on a first number of columns of a sub-matrix of a first matrix, where the first matrix is based on an IFFT matrix that is used to generate an OFDM symbol of the OFDM communication, and where the first number of columns correspond to a number of subcarriers that carry the first set of time-domain guard interval samples, generating the OFDM symbol with the first set of time-domain guard interval samples and the second set of time-domain data samples based on a product of the permutation matrix and the first matrix applied to the first set of guard interval inputs and the second set of data inputs, and transmitting the OFDM symbol to a receiving device.

An apparatus for wireless communication at a transmitting device is described. The apparatus may include a processor, memory coupled with the processor, and instructions stored in the memory. The instructions may be executable by the processor to cause the apparatus to identify a first set of guard interval inputs and a second set of data inputs for an OFDM communication, where the OFDM communication has a first set of time-domain guard interval samples and a second set of time-domain data samples, determine a permutation matrix to map the first set of guard interval inputs to a subset of a set of subcarriers for the OFDM communication, the permutation matrix determined based on a first number of columns of a sub-matrix of a first matrix, where the first matrix is based on an IFFT matrix that is used to generate an OFDM symbol of the OFDM communication, and where the first number of columns correspond to a number of subcarriers that carry the first set of time-domain guard interval samples, generate the OFDM symbol with the first set of time-domain guard interval samples and the second set of time-domain data samples based on a product of the permutation matrix and the first matrix applied to the first set of guard interval inputs and the second set of data inputs, and transmit the OFDM symbol to a receiving device.

Another apparatus for wireless communication at a transmitting device is described. The apparatus may include means for identifying a first set of guard interval inputs and a second set of data inputs for an OFDM communication, where the OFDM communication has a first set of time-domain guard interval samples and a second set of time-domain data samples, means for determining a permutation matrix to map the first set of guard interval inputs to a subset of a set of subcarriers for the OFDM communication, the permutation matrix determined based on a first number of columns of a sub-matrix of a first matrix, where the first matrix is based on an IFFT matrix that is used to generate an OFDM symbol of the OFDM communication, and where the first number of columns correspond to a number of subcarriers that carry the first set of time-domain guard interval samples, means for generating the OFDM symbol with the first set of time-domain guard interval samples and the second set of time-domain data samples based on a product of the permutation matrix and the first matrix applied to the first set of guard interval inputs and the second set of data inputs, and means for transmitting the OFDM symbol to a receiving device.

A non-transitory computer-readable medium storing code for wireless communication at a transmitting device is described. The code may include instructions executable by a processor to identify a first set of guard interval inputs and a second set of data inputs for an OFDM communication, where the OFDM communication has a first set of time-domain guard interval samples and a second set of time-domain data samples, determine a permutation matrix to map the first set of guard interval inputs to a subset of a set of subcarriers for the OFDM communication, the permutation matrix determined based on a first number of columns of a sub-matrix of a first matrix, where the first matrix is based on an IFFT matrix that is used to generate an OFDM symbol of the OFDM communication, and where the first number of columns correspond to a number of subcarriers that carry the first set of time-domain guard interval samples, generate the OFDM symbol with the first set of time-domain guard interval samples and the second set of time-domain data samples based on a product of the permutation matrix and the first matrix applied to the first set of guard interval inputs and the second set of data inputs, and transmit the OFDM symbol to a receiving device.

Some examples of the method, apparatuses, and non-transitory computer-readable medium described herein may further include operations, features, means, or instructions for identifying the sub-matrix of the first matrix based on a number of rows that correspond to a sum of a first number of guard interval header samples of the first set of time-domain guard interval samples and a second number of guard interval tail samples of the first set of time-domain guard interval samples, and a number of columns that correspond to the number of subcarriers that carry the first set of time-domain guard interval samples. In some examples of the method, apparatuses, and non-transitory computer-readable medium described herein, the IFFT matrix may have a length that corresponds to a sum of a first number of time-domain guard interval samples of the first set of time-domain guard interval samples and a second number of time-domain data samples of the second set of time-domain data samples.

Some examples of the method, apparatuses, and non-transitory computer-readable medium described herein may further include operations, features, means, or instructions for receiving, from a base station, configuration information that indicates the permutation matrix that is to be used to generate the OFDM symbol that includes the first set of time-domain guard interval samples. In some examples of the method, apparatuses, and non-transitory computer-readable medium described herein, the permutation matrix may be determined based on one or more parameters that are specified, that are included with the configuration information, that are determined based on one or more conditions associated with the OFDM symbol, or any combinations thereof. In some examples of the method, apparatuses, and non-transitory computer-readable medium described herein, the receiving the configuration information may include operations, features, means, or instructions for receiving one or more parameters for determination of the permutation matrix via radio resource control (RRC) signaling, a medium access control (MAC) control element (CE), downlink control information (DCI), or any combinations thereof.

In some examples of the method, apparatuses, and non-transitory computer-readable medium described herein, the first number of columns of the sub-matrix may be selected as quasi-equidistant columns from a total number of columns of the first matrix. In some examples of the method, apparatuses, and non-transitory computer-readable medium described herein, the first matrix may be a product of the IFFT matrix and a sub-carrier mapping matrix, and the sub-matrix includes columns of the first matrix that correspond to a subset of active subcarriers for the OFDM symbol that do not include guard subcarriers associated with a guard band of the OFDM symbol. In some examples of the method, apparatuses, and non-transitory computer-readable medium described herein, the first matrix corresponds to the IFFT matrix, and the sub-matrix includes columns of the first matrix that correspond to all subcarriers for the OFDM symbol including guard subcarriers associated with a guard band of the OFDM symbol, and one or more columns of the sub-matrix that are associated with the guard subcarriers may be discarded.

In some examples of the method, apparatuses, and non-transitory computer-readable medium described herein, the determining the permutation matrix may include operations, features, means, or instructions for performing a QR decomposition with column pivoting on the sub-matrix to determine an ordered set of columns that are ordered according to linear independence and selecting the first number of columns from the ordered set of columns. In some examples of the method, apparatuses, and non-transitory computer-readable medium described herein, the first matrix may be a product of the IFFT matrix and a sub-carrier mapping matrix, and the first number of columns may be selected in sequential order from an initial column of the ordered set of columns. In some examples of the method, apparatuses, and non-transitory computer-readable medium described herein, the first matrix corresponds to the IFFT matrix and a first subset of columns of the ordered set of columns is associated with one or more guard subcarriers for the OFDM symbol, and a second subset of columns of the ordered set of columns is associated with one or more non-guard subcarriers for the OFDM symbol, and where the first number of columns is selected in sequential order from the second subset of columns.

A method for wireless communication at a base station is described. The method may include determining configuration information for a first transmitter for OFDM communication, where the configuration information indicates that OFDM symbols within the OFDM communication include a first set of time-domain guard interval samples and a second set of time-domain data samples, and a permutation matrix is to be used to map a first set of guard interval inputs to a subset of a set of subcarriers for the OFDM communication, transmitting the configuration information to the first transmitter, and communicating with the first transmitter using guard-interval-based OFDM communications based on the configuration information.

An apparatus for wireless communication at a base station is described. The apparatus may include a processor, memory coupled with the processor, and instructions stored in the memory. The instructions may be executable by the processor to cause the apparatus to determine configuration information for a first transmitter for OFDM communication, where the configuration information indicates that OFDM symbols within the OFDM communication include a first set of time-domain guard interval samples and a second set of time-domain data samples, and a permutation matrix is to be used to map a first set of guard interval inputs to a subset of a set of subcarriers for the OFDM communication, transmit the configuration information to the first transmitter, and communicate with the first transmitter using guard-interval-based OFDM communications based on the configuration information.

Another apparatus for wireless communication at a base station is described. The apparatus may include means for determining configuration information for a first transmitter for OFDM communication, where the configuration information indicates that OFDM symbols within the OFDM communication include a first set of time-domain guard interval samples and a second set of time-domain data samples, and a permutation matrix is to be used to map a first set of guard interval inputs to a subset of a set of subcarriers for the OFDM communication, means for transmitting the configuration information to the first transmitter, and means for communicating with the first transmitter using guard-interval-based OFDM communications based on the configuration information.

A non-transitory computer-readable medium storing code for wireless communication at a base station is described. The code may include instructions executable by a processor to determine configuration information for a first transmitter for OFDM communication, where the configuration information indicates that OFDM symbols within the OFDM communication include a first set of time-domain guard interval samples and a second set of time-domain data samples, and a permutation matrix is to be used to map a first set of guard interval inputs to a subset of a set of subcarriers for the OFDM communication, transmit the configuration information to the first transmitter, and communicate with the first transmitter using guard-interval-based OFDM communications based on the configuration information.

In some examples of the method, apparatuses, and non-transitory computer-readable medium described herein, one or more parameters for generating the permutation matrix are specified, are transmitted in the configuration information, are implicitly derived based on conditions associated with the OFDM communication, or any combinations thereof. In some examples of the method, apparatuses, and non-transitory computer-readable medium described herein, the one or more parameters for generating the permutation matrix may be provided in RRC signaling, in a MAC-CE, in DCI, or any combinations thereof.

In some examples of the method, apparatuses, and non-transitory computer-readable medium described herein, the permutation matrix may be based on a first number of columns of a sub-matrix of a first matrix, where the first matrix is based on an IFFT matrix that is used to generate an OFDM symbol of the OFDM communication, and where the first number of columns correspond to a number of subcarriers that carry the first set of time-domain guard interval samples. In some examples of the method, apparatuses, and non-transitory computer-readable medium described herein, the first number of columns of the sub-matrix may be selected as quasi-equidistant columns from a total number of columns of the first matrix. In some examples of the method, apparatuses, and non-transitory computer-readable medium described herein, the first matrix may be a product of the IFFT matrix and a sub-carrier mapping matrix, and the sub-matrix includes columns of the first matrix that correspond to a subset of active subcarriers for the OFDM symbol that do not include guard subcarriers associated with a guard band of the OFDM symbol. In some examples of the method, apparatuses, and non-transitory computer-readable medium described herein, the first matrix corresponds to the IFFT matrix, and the sub-matrix includes columns of the first matrix that correspond to all subcarriers for the OFDM symbol including guard subcarriers associated with a guard band of the OFDM symbol, and one or more columns of the sub-matrix that are associated with the guard subcarriers may be discarded.

In some examples of the method, apparatuses, and non-transitory computer-readable medium described herein, the first number of columns of the sub-matrix may be selected by performing a QR decomposition with column pivoting on the sub-matrix to determine an ordered set of columns that are ordered according to linear independence, and selecting the first number of columns from the ordered set of columns. In some examples of the method, apparatuses, and non-transitory computer-readable medium described herein, the first matrix may be a product of the IFFT matrix and a sub-carrier mapping matrix, and the first number of columns may be selected in sequential order from an initial column of the ordered set of columns. In some examples of the method, apparatuses, and non-transitory computer-readable medium described herein, the first matrix corresponds to the IFFT matrix and a first subset of columns of the ordered set of columns is associated with one or more guard subcarriers for the OFDM symbol, and a second subset of columns of the ordered set of columns is associated with one or more non-guard subcarriers for the OFDM symbol, and where the first number of columns is selected in sequential order from the second subset of columns.

DETAILED DESCRIPTION

Figure 1:
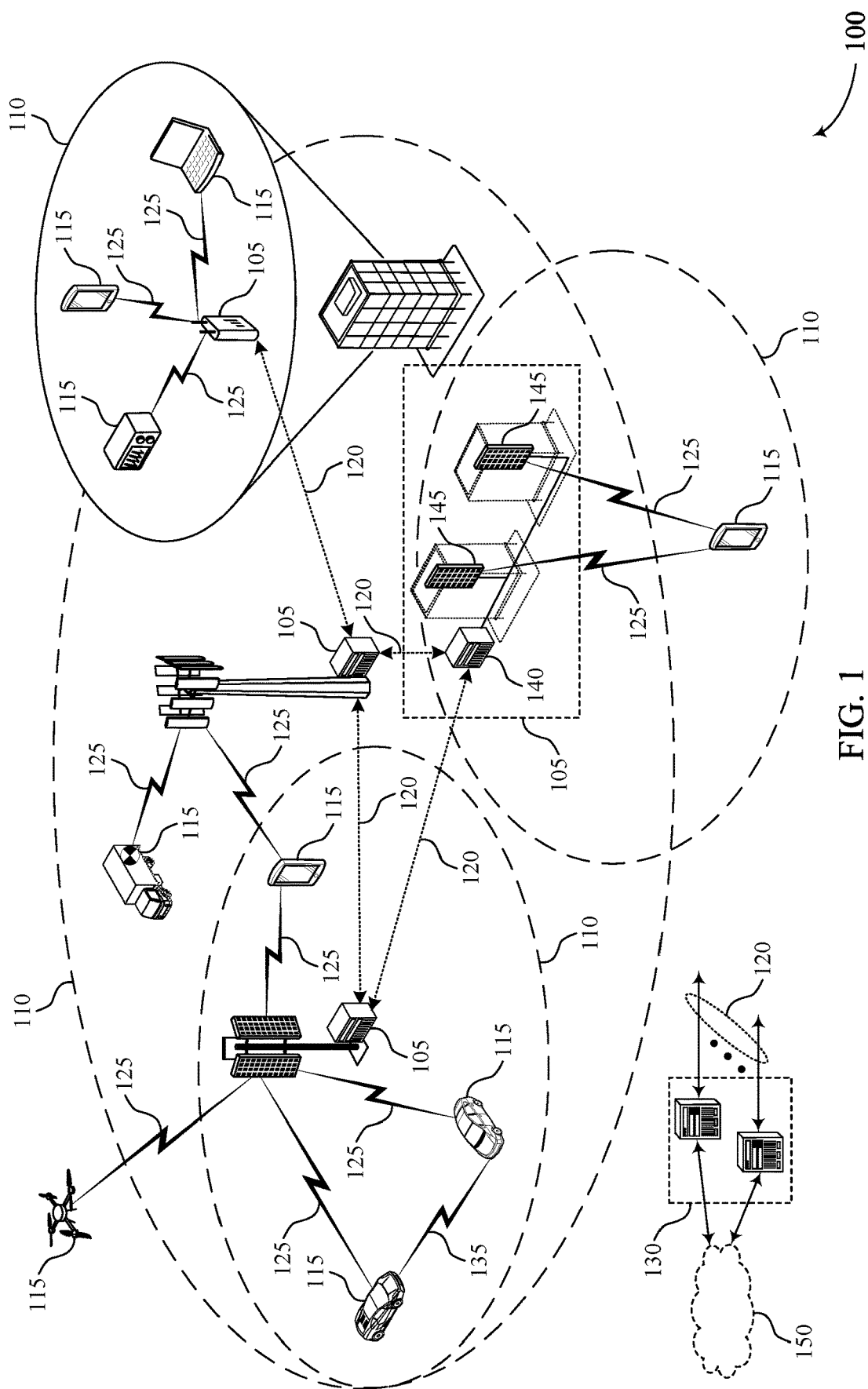
FIG. 1 illustrates an example of a wireless communications system that supports subcarrier mapping techniques for guard interval (GI)-based orthogonal frequency division multiplexing (OFDM) communications in accordance with aspects of the present disclosure.

In some wireless communications systems, a user equipment (UE) and a base station may communicate within a set of symbols in accordance with one or more symbol formats. As used herein, a set of symbols may correspond to one or more slots, one or more subframes, one or more frames, or any other transmission time interval (TTI). In some cases, UEs base stations may communicate using different waveforms to increase bandwidth in higher frequency bands, including cyclic prefix (CP) based waveforms and guard interval (GI) based waveforms. CP-based waveforms allow for both the CP and data to be self-contained within a symbol, and thus within a slot. GI-based waveforms have a GI that may include a tail, a head, or both, for each symbol. The GI samples may include unique word (UW) or zero-tail (ZT) GIs, where the UW provides some known signal or sequence and can thus provide some amount of information.

In some cases, adding a UW-based GI to an OFDM waveform is performed by providing separate data subcarriers and redundant subcarriers at an inverse fast Fourier transform (IFFT) input, where the UW is carried by the redundant subcarriers. Using traditional subcarrier mapping between a UW inserted at the head/tail of a data transmission may result in some subcarriers or groups of subcarriers having a relatively high energy that may not be supported by a transmitting device, such as a UE or base station (e.g., as a result of the UW sequence not being random, like a CP would be). In various aspects discussed herein, techniques are provided that support UW-based GI in such cases. In some cases, signal processing may be performed on GI and data samples to provide suitable energy/power levels at the transmitting device. In accordance with various aspects discussed herein, a permutation of the GI and data samples prior to subcarrier mapping may be performed in order to provide power properties of a transmitted OFDM symbol that are sustainable by the transmitting device. Further, in some wireless communications systems (e.g., 5G systems), relatively large FFT sizes may be employed (e.g., some 5G systems may use length 2048 or 4096 FFTs), such that signal processing on all FFT samples may require substantial amounts of memory and processing resources that may not be available at some transmitters (e.g., user equipment (UE) devices). Thus, various techniques to determine a permutation matrix with acceptable power properties for GI-based OFDM with UWs are described herein that provide acceptable power properties with relatively low amounts of memory and processing resources.

In some cases, a permutation matrix (P) to map the redundant subcarriers for generation of an OFDM waveform with specific time domain header/tail is determined based on a sub-matrix (Z) of a first matrix (K). The columns of Z, in some cases, may correspond to redundant subcarriers (e.g., a number of which are $N_r$) for the GI samples of the OFDM waveform. The first matrix (K) may be either an IFFT matrix $(F_N^{-1})$, or a product of the IFFT matrix $(F_N^{-1})$ and a subcarrier mapping matrix (B) (i.e., $K=F_N^{-1}B$). In some cases, K is the product of the $F_N^{-1}$ and B if guard tones of the OFDM waveform are not considered when selecting columns of K for inclusion in Z. In other cases, K is $F_N^{-1}$ if guard tones are considered when selecting columns of K for inclusion in Z. If guard tones are considered when selecting the columns of K, any columns that are outside of the desired subcarrier range may be discarded. In some cases, the columns of K that are selected for inclusion in Z are selected as quasi-equidistant columns of K (e.g., either exactly equidistant or as close as can be achieved based on the number of columns of K).

In other cases, K may be determined by performing a QR decomposition with column pivoting on the matrix Z, with the first $N_r$ columns of the QR decomposition selected. In cases where guard tones are used when performing the QR decomposition, any columns that are outside of the desired subcarrier range may be discarded and the top remaining $N_r$ columns of the QR decomposition selected. A QR decomposition is a well-known processing technique that provides a decomposition of a matrix (A) into a product (A=QR) of an orthogonal matrix (Q) and an upper triangular matrix (R). QR decomposition with column pivoting may be used with rank deficient (or nearly rank deficient) least squared problems, and may permute the columns such that each newly selected column in the QR decomposition is as linearly independent as possible (e.g., a ranked order of columns is provided based on linear independence).

Aspects of the disclosure are initially described in the context of wireless communications systems. Additional aspects are described with reference to CP and GI slot formats, processing techniques for data and GI samples, and process flows. Aspects of the disclosure are further illustrated by and described with reference to apparatus diagrams, system diagrams, and flowcharts that relate to subcarrier mapping techniques for GI-based OFDM communications.

FIG. 1 illustrates an example of a wireless communications system 100 that supports subcarrier mapping techniques for GI-based OFDM communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, one or more UEs 115 or base stations 105 may communicate using GI-based OFDM symbols. Further, in some cases, zero-head/zero-tail or unique word GIs may be used, where unique word GIs may be used to convey some information, that is separate from information contained in data resource elements of the OFDM symbols. As discussed herein, in some cases GI-based OFDM symbols may result in portions of transmissions that may have power levels that are unable to be sustained by the transmitting device. In accordance with various aspects, a UE 115 or base station 105 may generate OFDM symbols based on a permutation matrix (P) that permutes GI samples and data samples such that the OFDM symbols have power values across the symbols that are supportable by a transmitting device. In some cases, the transmitting device may identify GI inputs and data inputs for an OFDM communication, and the permutation matrix maps the GI inputs to a subset of subcarriers for the OFDM communication, where the permutation matrix determined based at least in part on a first number of columns of a sub-matrix (Z) of a first matrix (K). In some cases, the first matrix (K) may be an IFFT matrix ($F_N^{-1}$). In some cases, the first matrix (K) may be a product of the IFFT matrix ($F_N^{-1}$) and a subcarrier mapping matrix (B) (i.e., $K=F_N^{-1}B$). The first number of columns may correspond to a number of subcarriers that carry time-domain GI samples. An OFDM symbol with the time-domain GI samples and time-domain data samples may be generated based at least in part on a product of the permutation matrix and the first matrix.

Figure 2:
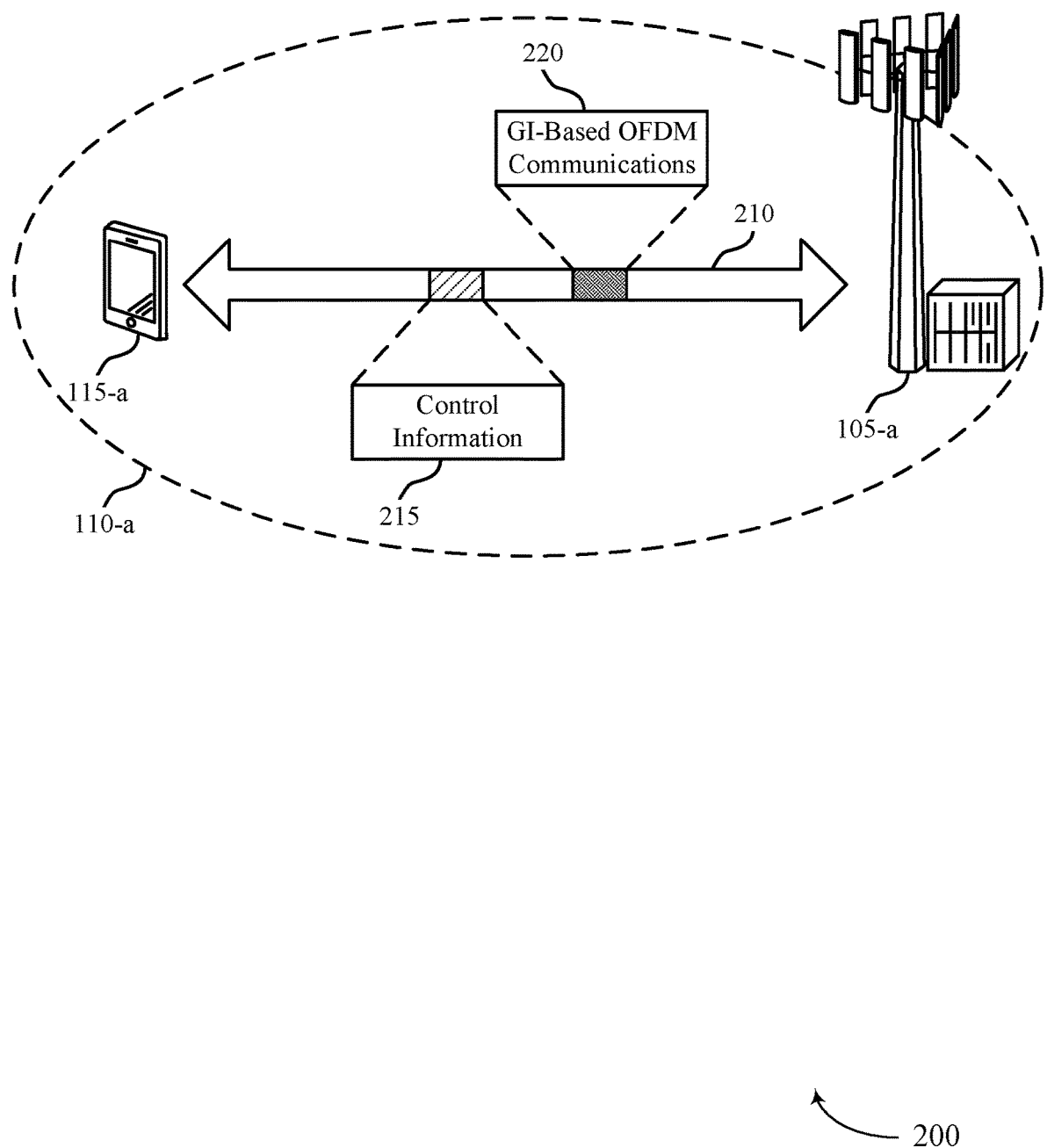
FIG. 2 illustrates an example of a wireless communications system that supports subcarrier MAPPING techniques for GI-based OFDM communications in accordance with aspects of the present disclosure.

FIG. 2 illustrates an example of a wireless communications system 200 that supports subcarrier mapping techniques for GI-based OFDM communications in accordance with aspects of the present disclosure. The wireless communications system 200 may include a base station 105-a and a UE 115-a, which may represent examples of a base station 105 and a UE 115 as described with reference to FIG. 1. The base station 105-a and the UE 115-a may communicate within a geographic coverage area 110-a and via a communication link 210. In some examples, the base station 105-a and UE 115-a may communicate using GI-based OFDM communications 220, and the base station 105-a may transmit a control information 215 to the UE 115-a.

In some cases, the control information 215 may indicate that OFDM symbols within the GI-based OFDM communications 220 include a first set of time-domain guard interval samples and a second set of time-domain data samples, and a permutation matrix is to be used to map a first set of guard interval inputs to a subset of a set of subcarriers for the OFDM communication. The UE 115-a and the base station 105-a may communicate via the communication link 210 in accordance with the configured GI-based communications 220. In some examples, the UE 115-a and the base station 105-a may communicate over a relatively high operating frequency band, such as frequency range two (FR2), using GI-based OFDM waveforms that support uplink communications, downlink communications, or both. In some cases, UE 115-a and base station 105-a may use multiple different types of waveforms, which may include GI-based OFDM waveforms, cyclic prefix (CP)-OFDM waveforms, single carrier frequency domain waveforms (e.g., DFT-s-OFDM), a single carrier time domain waveforms (e.g., single carrier quadrature amplitude modulation (SC-QAM)), or any combinations thereof.

In some cases, the control information 215 may provide for efficient GI-based OFDM processing, and may be transmitted in one or more transmissions from the base station 105-a (e.g., in RRC signaling, in a MAC control element (MAC-CE), in downlink control information (DCI), in other control signaling, or any combinations thereof). OFDM symbols as described herein may include OFDM symbols of one or more slots, sub-slots, subframes, frames, or any other TTI. A configuration for generation of OFDM symbols may indicate a configuration of GIs, CPs, symbol sizes of one or more symbols, DFT sizes associated with one or more DFT windows, other parameters associated with communications in the OFDM symbols, or any combination thereof. An example of a GI-based OFDM symbol structure is illustrated in FIG. 3.

Figure 3:
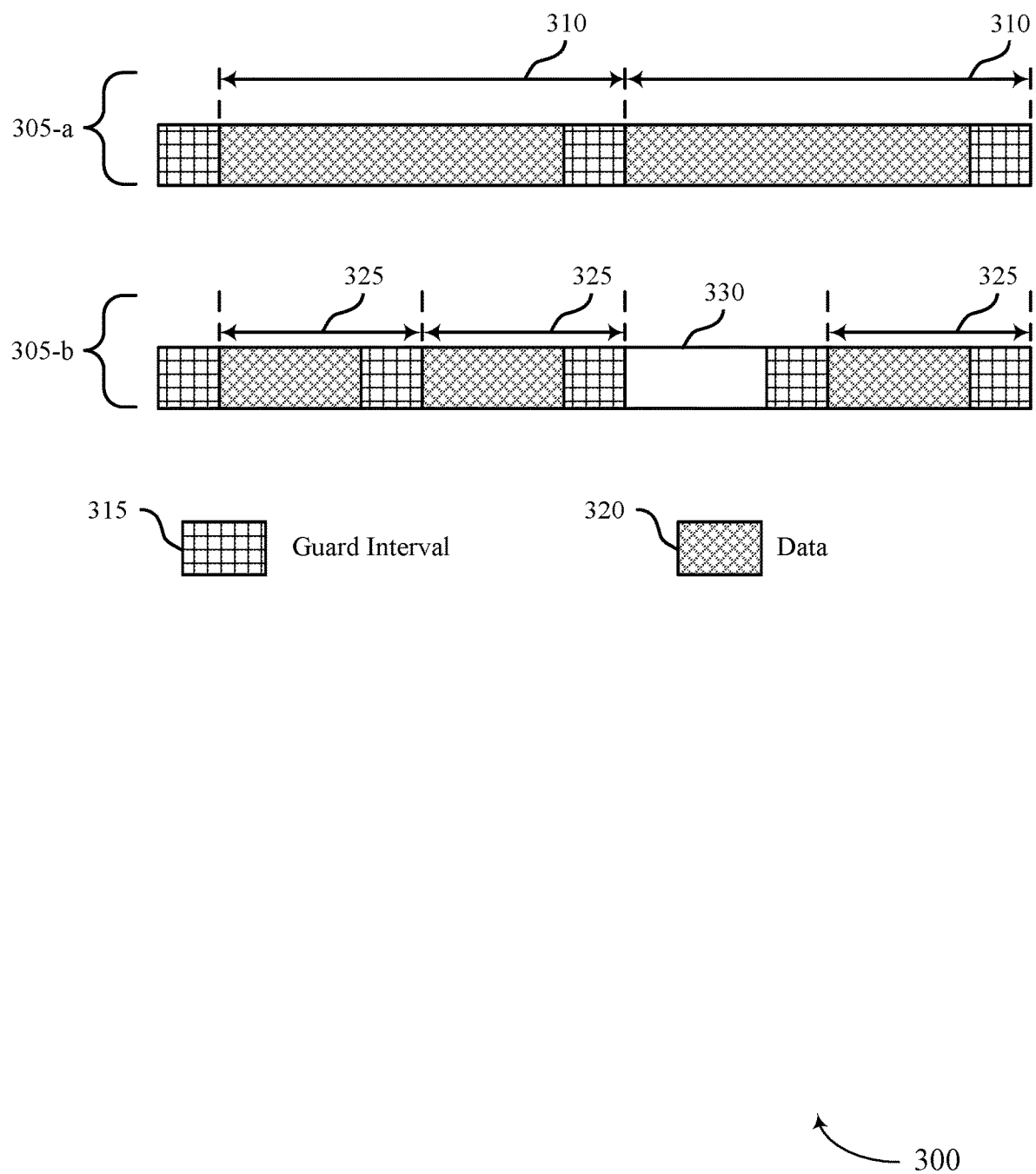
FIG. 3 illustrates an example of symbol structures for OFDM communications, including GI-based OFDM symbols that support subcarrier mapping techniques in accordance with aspects of the present disclosure.

FIG. 3 illustrates an example of symbol structures 300 that support subcarrier mapping techniques for GI-based OFDM communications in accordance with aspects of the present disclosure. The symbol structures 300 may represent example configurations for communications between a UE 115 and a base station 105. The UE 115 and the base station 105 may be examples of a UE 115 and a base station 105 as described with reference to FIGS. 1 and 2. In some examples, the base station may transmit an indication of a symbol structure 300 to the UE, such as in control information as described with reference to FIG. 2.

In the example of FIG. 3, a first symbol configuration 305-a may be a GI-based structure in which symbols 310 each have an associated guard interval 315. A second symbol configuration 305-b may also be a GI-based structure in which symbols 325 each have an associated guard interval 315. Data 320 may be transmitted in each symbol 310, 325. The base station may transmit control signaling to the UE to indicate a configuration for the symbol configurations 305. In this example, the first symbol configuration 305-a may indicate a first symbol duration for symbols 310, and a second symbol configuration 305-b may indicate a second symbol duration for symbols 325. The base station may indicate the different symbol duration based on one or more communication parameters, for example. In some cases, the base station may indicate a location and contents of an additional period 330 to the UE via the configuration for the second symbol configuration 305-b, or via other control signaling. The additional period 330 may be used for transmission of data, one or more reference signals, or both. Additionally or alternatively, the additional period 330 may be a gap period that may include null resources (e.g., empty resources).

In the example of FIG. 3, the symbol structures 300 may provide non-slot contained GI-based symbol formats. A slot that is configured according to the symbol structures 300 may include a quantity of symbols that each include data 320 (e.g., 15 OFDM symbols per slot) and a corresponding guard interval 315. A guard interval 315 for a first symbol in a slot may be included in a prior slot. A transmitting device may configure the guard intervals 315 by inserting a sequence of data (e.g., known data) into each symbol in the slot before. As such, the information in each guard interval 315 may be utilized for synchronization, channel estimation, phase tracking, or other applications, which may reduce overhead as compared with cyclic prefix-based symbol formats. In some cases, the guard interval 315 may vary symbol-to-symbol in a slot, and the symbol duration and FFT window size may remain constant. The GI-based symbol structures 300 may thereby adapt to delay spreads without changing a symbol duration, which may provide for improved communication reliability and reduced latency.

There may be multiple ways that a guard interval 315 may be implemented. For example, a zero-tail (ZT) GI may be implemented, where zeros are appended at the end (and possibly the beginning) of the symbols 310, 325. In other examples, a unique-word (UW) GI may be implemented, where some known signal or sequence is appended to the end (and possibly the beginning) of modulation symbols. In cases of UW GIs, a systematic approach may be implemented to generate the guard interval 315. Such a systematic approach may provide that separate data and redundant subcarriers exist at an IFFT input. Further, redundant subcarriers may have, on average, have higher power than data subcarriers, as discussed herein, and thus the position of redundant subcarriers may be selected to provide manageable power levels at the transmitting device. In accordance with various aspects discussed herein, a permutation matrix (P) may be implemented to provide suitable power levels for GI-based OFDM communications.

Figure 4:
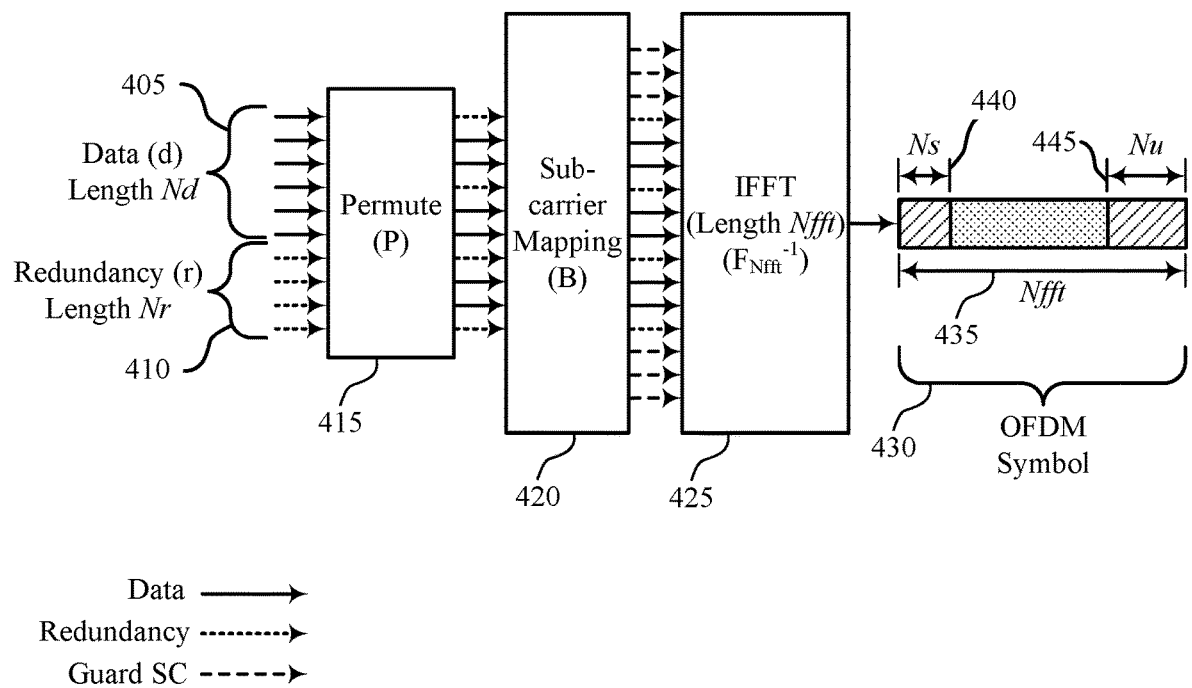
FIG. 4 illustrates an example of an OFDM symbol generation technique that supports subcarrier mapping techniques for GI-based OFDM communications in accordance with aspects of the present disclosure.

FIG. 4 illustrates an example of a OFDM symbol generation technique 400 that supports subcarrier mapping techniques for GI-based OFDM communications in accordance with aspects of the present disclosure. The OFDM symbol generation technique 400 may represent examples of GI generation methods as described herein.

In the example of FIG. 4, a UW may be used for the GI, where the UW is spread along with data 405 (having length Nd) for the symbol, with the GI samples provided in redundancy carriers 410, having a length Nr. In this example, the GI (e.g. a tail and optionally a header GI) may be provided along with data to a permutation matrix (P) 415. A subcarrier mapping matrix 420 (e.g., mapping matrix B) may be applied to the permuted samples and the mapped output provided to IFFT 425 (e.g., for an IFFT of length Nfft, represented by matrix $F_{Nfft}^{-1}$). The output of IFFT 425 may provide an OFDM symbol 430 having a length (Nfft) 435 having data of length x and with a GI that has an optional head 440 (of length Ns) and a tail 445 (of length Nu, where Ns+Nu is the total GI length).

In the systematic approach for generating the GI, redundant sub-carriers 410 are inserted at the IFFT 425 input, where a number of such subcarriers (e.g., Nr) is dependent on data (d) length (e.g., Nd) and number of redundant carriers 410 (Nr). As discussed herein, mapping the redundancy subcarriers into the IFFT 425 input may have an impact on power requirements for transmission of the OFDM symbol 430. For example, selection of unoptimized locations or mapping may yield a relatively high energy at the IFFT 425 output, requiring relatively high power requirements that may not be sustainable by the transmitting device. In accordance with various aspects discussed herein, the permutation (P) matrix 415 may be provided to manage the possible energy increase at the IFFT 425 output. The IFFT 425 output may be represented by (assuming no head GI and thus no Ns):

$$\begin{bmatrix} x \\ u \end{bmatrix} = F_N^{-1} BP \begin{bmatrix} d \\ r \end{bmatrix},$$

where $F_N^{-1}$ is IFFT of length N, and B is the subcarrier mapping. If $M = F_N^{-1} BP$, then this can be represented as:

$$\begin{bmatrix} x \\ u \end{bmatrix} = \begin{bmatrix} M_{11} & M_{12} \\ M_{21} & M_{22} \end{bmatrix} \begin{bmatrix} d \\ r \end{bmatrix}, u = M_{21}d + M_{22}r$$

and r estimate=$\hat{r}=M_{22}^+(u-M_{21}d)$, where $M_{22}^+$ is the pseudo-inverse of $M_{22}$. In some cases, other ways to get r can also be used (e.g., QR factorization, SVD, etc.).

In cases where a header GI sample is present, s is of length Ns, x is of length Nx, u is of length Nu, and the following model may be used:

$$\begin{bmatrix} s \\ x \\ u \end{bmatrix} = M \begin{bmatrix} d \\ r \end{bmatrix}, \text{ where } M = F_N^{-1} BP,$$

Where s is the header samples of length Ns, and thus:

$$\begin{bmatrix} s \\ x \\ u \end{bmatrix} = \begin{bmatrix} M_{12} & M_{12} \\ M_{21} & M_{22} \\ M_{31} & M_{32} \end{bmatrix} \begin{bmatrix} d \\ r \end{bmatrix} \rightarrow \begin{bmatrix} s \\ u \end{bmatrix} = \begin{bmatrix} M_{11} & M_{12} \\ M_{31} & M_{32} \end{bmatrix} \begin{bmatrix} d \\ r \end{bmatrix}$$

In some cases, r can be estimated, such as using the approach:

$$\hat{r} = \begin{bmatrix} M_{12} \\ M_{32} \end{bmatrix}^+ \left( \begin{bmatrix} s \\ u \end{bmatrix} - \begin{bmatrix} M_{11} \\ M_{31} \end{bmatrix} d \right),$$

where $(\cdot)^+$ is the pseudo-inverse.

Other possible approaches for such an estimate include QR decomposition and SVD.

As discussed herein, determination of the permutation matrix (P) may provide for manageable energy increase at the IFFT 425 output. For example, if an identity matrix is used as P, the redundant subcarriers have a relatively high energy that in some cases may not be supported by a transmitting device. Some existing techniques have been proposed for the selection of P to reduce the energy associated with redundant subcarriers, but such techniques may not be practical for relatively large FFT sizes (e.g., FFT sizes used in 5G systems). For example, techniques may have a complexity of algorithms in the order of Nfft×Nfft, which would require substantial processing and memory resources that may not be available at a transmitting device. Additionally, in some cases, such techniques may have interim calculations that may have a singular matrix inversion. Further, the complexity of such proposed algorithms may preclude real time (online) calculations of P (e.g., P may be calculated offline and stored). However, in some systems (e.g., some 5G systems), the number of resource blocks (RBs) of a resource allocation may be dynamic, and having a separate P stored for every allocation may require large memory that may not be available in some devices. In accordance with various techniques discussed herein, columns of a sub-matrix may be selected and used to determine P, which may provide enhanced efficiency and real time calculation of a P with suitable power properties.

Figure 5A:
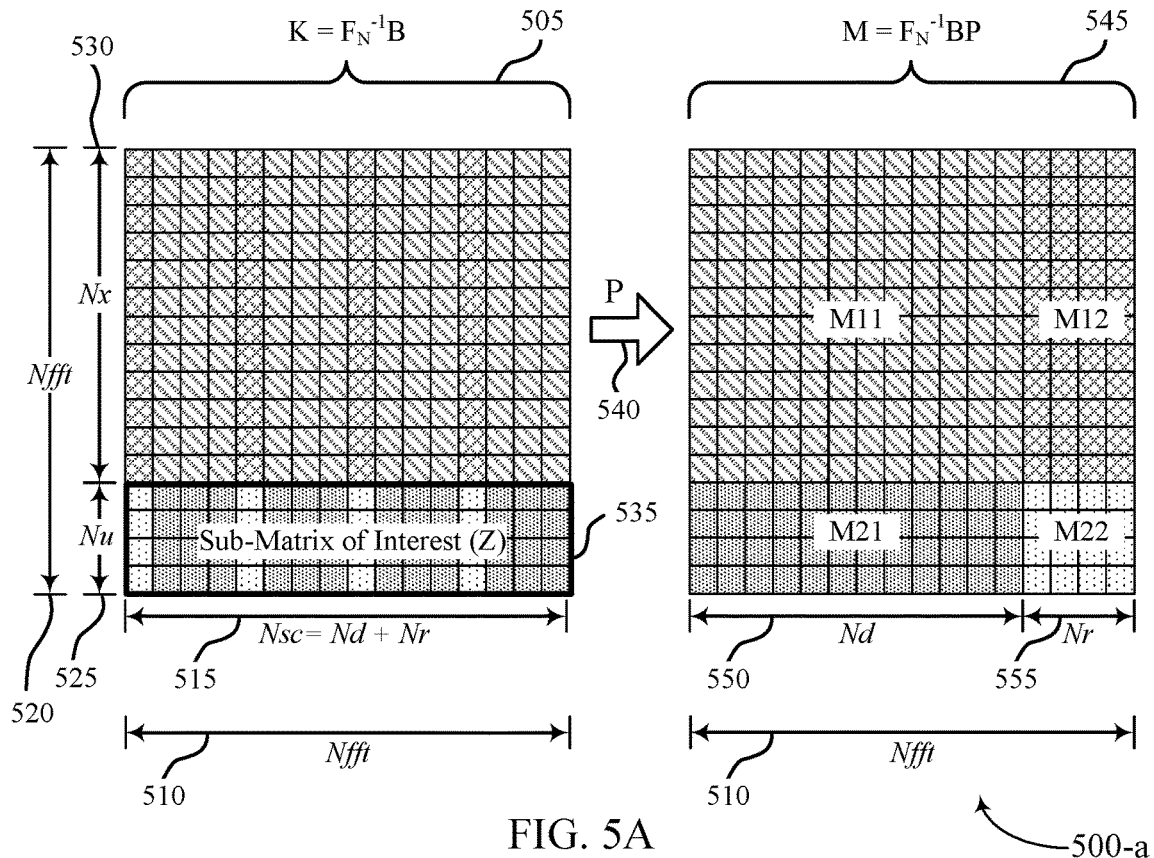
FIGS. 5A, 5B, and 6 through 7 illustrate examples of unique word OFDM symbol generation that support subcarrier mapping techniques for GI-based OFDM communications in accordance with aspects of the present disclosure.
Figure 5B:
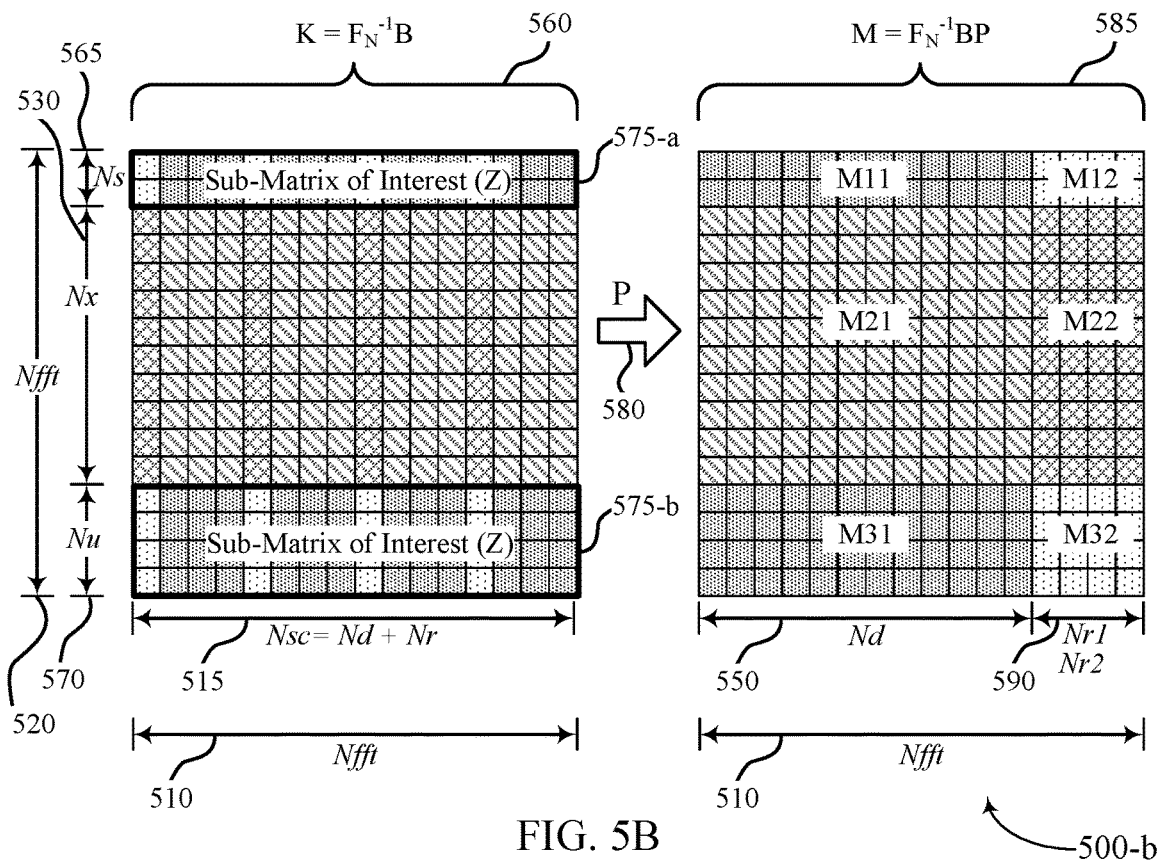

FIGS. 5A and 5B illustrate examples of unique word OFDM symbol generation 500 that support subcarrier mapping techniques for GI-based OFDM communications in accordance with aspects of the present disclosure. The examples of OFDM symbol generation 500 may represent OFDM symbol generation configurations for communications between a UE 115 and a base station 105. The UE 115 and the base station 105 may be examples of a UE 115 and a base station 105 as described with reference to FIGS. 1 and 2.

In the example of FIG. 5A, an example of unique word OFDM symbol generation 500-a may include a first matrix (K) 505, which is a product of an IFFT matrix ($F_N^{-1}$) and subcarrier mapping matrix (B). The first matrix (K) 505 may have a number of columns 510 that corresponds to Nfft, and a number of rows 520 that corresponds to Nfft. In this example, a number of subcarriers (Nsc) 515 may be a sum of the number of data subcarriers and the number of redundancy subcarriers (e.g., Nsc=Nd+Nr). Further, the number of rows 520 may include Nu rows 525 associated with a tail GI, and Nx rows 530 associated with data. The first matrix (K) 505 may be permuted by permutation matrix (P) 540 to generate M=$F_N^{-1}$BP matrix 545 that has data in Nd columns 550 and GI in Nr columns 555. In this case, M may be represented as:

$$\begin{bmatrix} M_{11} & M_{12} \\ M_{21} & M_{22} \end{bmatrix}.$$

In the example of FIG. 5B, an example of unique word OFDM symbol generation 500-b may include a first matrix (K) 560, which is a product of an IFFT matrix ($F_N^{-1}$) and subcarrier mapping matrix (B). The first matrix (K) 560 may have a number of columns 510 that corresponds to Nfft, and a number of rows 520 that corresponds to Nfft. In this example, a number of subcarriers (Nsc) 515 may be a sum of the number of data subcarriers and the number of redundancy subcarriers (e.g., Nsc=Nd+Nr). Further, the number of rows 520 may include Nu rows 570 associated with a tail GI, Nx rows 530 associated with data, and Ns rows 565 associated with a header GI. The first matrix (K) 560 may be permuted by permutation matrix (P) 580 to generate M=$F_N^{-1}$BP matrix 585 that has data in Nd columns 550 and GI in Nr1 and Nr2 columns 590. In this case, M may be represented as:

$$\begin{bmatrix} M_{11} & M_{12} \\ M_{21} & M_{22} \\ M_{31} & M_{32} \end{bmatrix}.$$

The power increase associated with the GI may result from the inversion of a matrix (referred to as A) when trying to solve for the redundant subcarriers such as:

A=$M_{22}$ when trying to solve for tail GI only, and $$A = \begin{bmatrix} M_{12} \\ M_{32} \end{bmatrix}$$

when trying to solve for header and tail GI.

If A has good condition number, the power output may be manageable by the transmitting device. However, if A is ill-conditioned, power may increase substantially, and in some cases to an amount that is not supported by the transmitting device. In some cases, the permutation matrix 540 or 580 may be selected such that the condition number of the matrix A is relatively small (e.g., closer to 1). Such a permutation may be equivalent to selecting certain columns from a sub-matrix of interest (Z) 535 of the first matrix (K) 505 where K=$F_N^{-1}$B. In some cases, Z may be constructed from the last Nu rows 525 of K (e.g., in cases where no header is present as illustrated in FIG. 5A). In other cases, the permutation may be equivalent to selecting certain columns from a first sub-matrix of interest (Z) 575-a and a second sub-matrix of interest (Z) 575-b of the first matrix (K) 560 where K=$F_N^{-1}$B. In some cases, Z may be constructed from the first Ns rows 565 and the last Nu rows 575 of K (e.g., in cases where the header is present as illustrated in FIG. 5B). By using the sub-matrix of interest Z, this reduces the problem from dealing with a Nfft×Nsc matrix to a much smaller (Ns+Nu)×Nsc matrix.

The selection of the columns of the sub-matrix of interest Z such that the condition of A is reduced may be performed in accordance with various techniques discussed herein. In some cases, for an OFDM waveform where specific time domain header and/or tail samples are needed, the permutation matrix needed to map the redundant sub-carriers (e.g., needed to generate such waveform) can be based on selecting Nr columns of a sub-matrix of interest (Z). The sub-matrix of interest (Z) may be composed of Nu rows or Ns+Nu rows of the matrix K (based on whether a header GI is present or not), where Nr is the number of redundant subcarriers, Ns is the number of time domain header samples, Nu is the number of time domain tail samples, $F_{Nfft}^{-1}$ is the IDFT matrix of size Nfft, and K (e.g., which may be an example of a first matrix) is defined based on a technique used to select columns of the sub-matrix of interest (Z). In some cases, the technique and parameters used to generate the permutation matrix and hence the redundant subcarrier mapping is known to the base station and the UE. For example the technique, parameters, or both may be defined in a specification associated with a wireless network (e.g., in a communications standard specification). In other cases, additionally or alternatively, the technique, parameters or both may be signaled from the base station to the UE. In still other cases, additionally or alternatively, the technique, parameters, or both may be implicitly derived based on certain conditions (e.g., based on whether CP or GI-based OFDM communications are configured, channel conditions, a modulation and coding scheme (MCS) indicated in a resource allocation, and the like).

Figure 6:
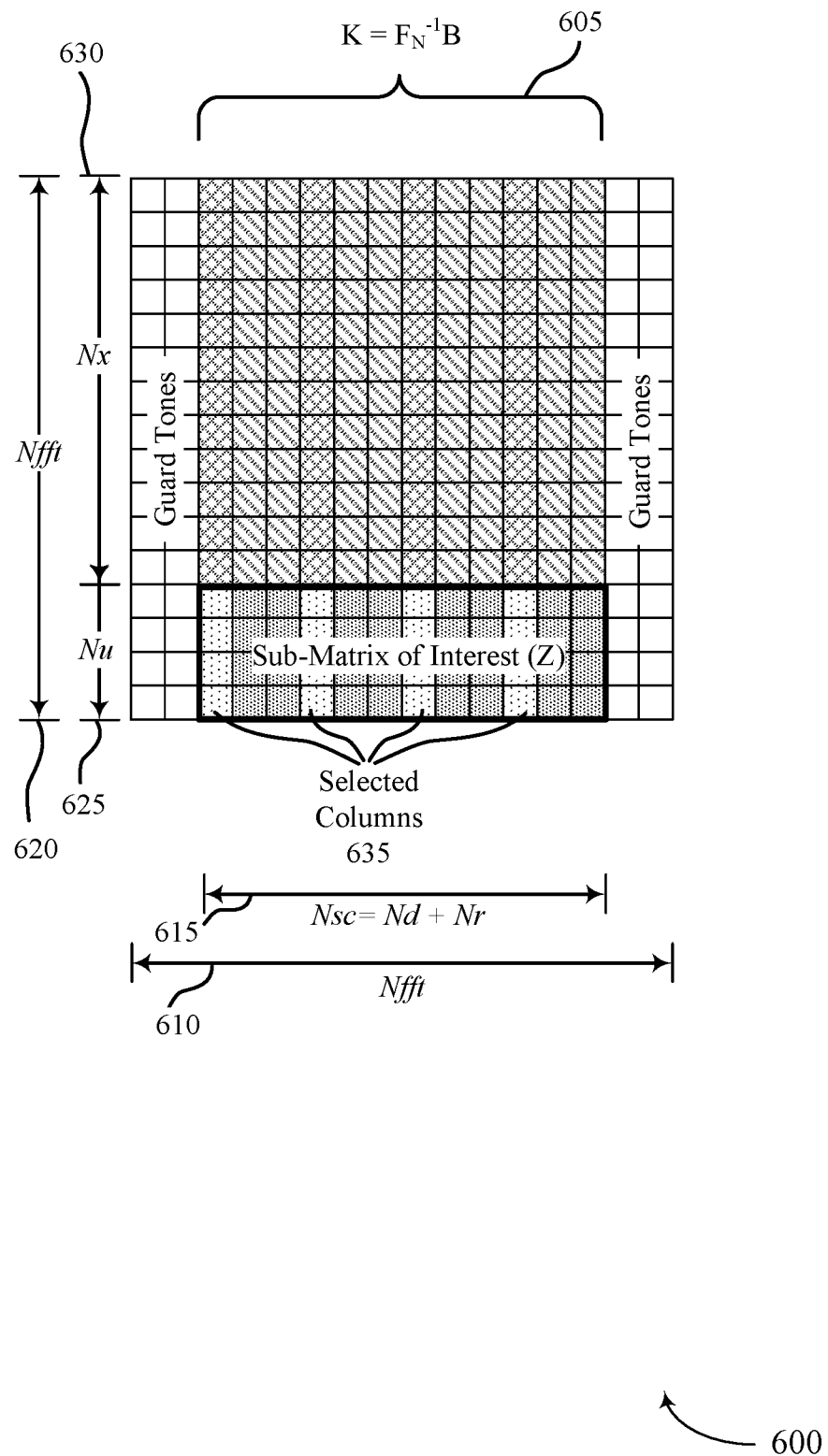

FIG. 6 illustrates an example of a unique word OFDM symbol generation 600 that supports subcarrier mapping techniques for GI-based OFDM communications in accordance with aspects of the present disclosure. The example OFDM symbol generation 600 may represent OFDM symbol generation for communications between a UE 115 and a base station 105. The UE 115 and the base station 105 may be examples of a UE 115 and a base station 105 as described with reference to FIGS. 1 and 2.

In this example, a first matrix (K) 605 may be based on a product of an IFFT matrix ($F_N^{-1}$) and a subcarrier mapping matrix (B) (e.g., $K=F_N^{-1}B$). The number of columns of the first matrix (K) 605 may correspond to Nsc 615 (e.g., where Nsc=Nd+Nr). A total number of columns 610 may correspond to Nfft, and include guard tones. A total number of rows 620 may also correspond to Nfft, and include GI rows Nu 625, and data rows Nx 630. In this example, a sub-matrix of interest (Z) may correspond to the GI rows Nu 625 and the columns Nsc 615. When selecting columns 635 of the sub-matrix of interest (Z) to determine the permutation matrix, in this example, a quasi-equidistant selection may be performed based on Nsc 615. It is noted that equidistant columns of a row sub-matrix of a DFT matrix are orthogonal, in cases where the number of columns needed (Nr) is a factor of the DFT size (e.g., Nfft=16, Nr=4, as illustrated in FIG. 6). If the number of columns needed (Nr) is not a factor of the DFT size (e.g., Nfft=16, Nr=5), the most orthogonal columns are quasi-equidistant.

In this example, the Nr columns are selected out of Nsc 615 (Nsc=Nd+Nr) columns of Z such that they are equidistant or quasi-equidistant. In this example, Z is composed of Ns+Nu rows of the first matrix $K=F_{Nfft}^{-1}B$ (e.g., of the active sub-carriers (without guard SCs), where B is the sub-carrier mapping matrix. In order to get equidistant or quasi-equidistant columns, the selected column indices within Z may be determined as:

$$\mathrm{mod}\left(\left(T_{shift} + \mathrm{round}\left(q\frac{Nsc}{Nr}\right)\right), Nsc\right)$$

where q=0, 1, ..., Nr−1, and
$T_{shift} \in \{0, 1, ..., Nsc-1\}$ is a shift value for FDM purposes. In the example of FIG. 6, Nfft=16, Nsc=12 (4 guard tones), Nu=Nr=4, Ns=0, Nd=8, Nx=12. It is noted that the size of Nfft=16 is shown for purposes of illustration and discussion, and much larger sizes of Nfft may be used.

Figure 7:
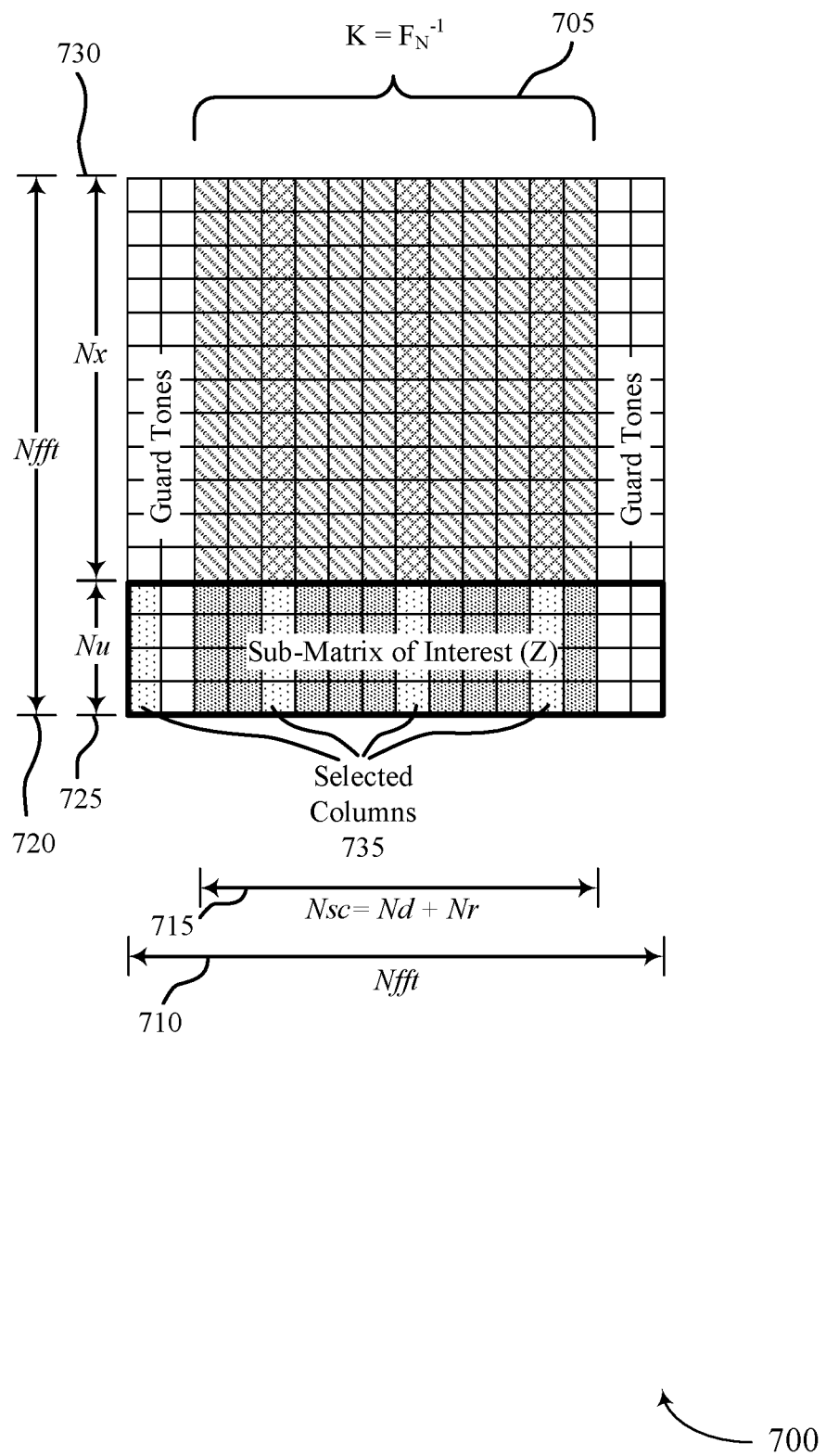

FIG. 7 illustrates another example of a unique word OFDM symbol generation 700 that supports subcarrier mapping techniques for GI-based OFDM communications in accordance with aspects of the present disclosure. that supports subcarrier mapping techniques for GI-based OFDM communications in accordance with aspects of the present disclosure. The example OFDM symbol generation 700 may represent OFDM symbol generation for communications between a UE 115 and a base station 105. The UE 115 and the base station 105 may be examples of a UE 115 and a base station 105 as described with reference to FIGS. 1 and 2.

In this example, a first matrix (K) 705 may correspond to the IFFT matrix ($F_N^{-1}$). The number of columns of the first matrix (K) 705 may correspond to Nsc 715 (e.g., where Nsc=Nd+Nr). A total number of columns 710 may correspond to Nfft, and include guard tones. A total number of rows 720 may also correspond to Nfft, and include GI rows Nu 725, and data rows Nx 730. In this example, a sub-matrix of interest (Z) may correspond to the GI rows Nu 725 and the total number of columns 710 including the gourd tone columns. When selecting columns sub-matrix of interest (Z) to determine the permutation matrix, in this example, a quasi-equidistant selection may be performed based on Nfft 710.

In the example of FIG. 7, the Nr columns may be determined by selecting Nq columns 735 out of Nfft 710 columns of Z such that they are equidistant or quasi-equidistant, where Z is composed of Ns+Nu rows of the first matrix (K) 705 and $K=F_{Nfft}^{-1}$. Nq may be selected column indices within Z that are determined as:

$$\mathrm{mod}\left(\left(T_{shift} + \mathrm{round}\left(q\frac{Nfft}{Nq}\right)\right), Nfft\right)$$

where q=0, 1, ..., Nr−1, and $T_{shift} \in \{0, 1, ..., Nfft-1\}$ is a shift value for FDM purposes. Then, Nr columns may be selected out of the Nq columns, where the Nr columns that lie in the desired sub-carrier range (e.g., not in the guard bands). In the example of FIG. 7, Nfft=16, Nsc=12 (4 guard tones), Nu=Nq=4, Ns=0, Nd=8, and Nx=12, such that Nr=3.

In further examples, QR factorization with column pivoting may be used to determine the columns for the permutation matrix. In such examples, the Nr columns may be selected by performing a QR decomposition with column pivoting (CP) on the matrix Z. In some cases, Z may be composed of Ns+Nu rows of the matrix $K=F_{Nfft}^{-1}B$, (e.g., of the active sub-carriers without guard SCs), and B is the sub-carrier mapping matrix. The first Nr columns that are used in the QR-CP algorithm then may be selected. In other cases, Z may be composed of Ns+Nu rows of the matrix $K=F_{Nfft}^{-1}$, and the first Nq columns that are used in the QR-CP algorithm may be selected. Then, Nr out of the Nq columns that lie in the desired sub-carrier range may be selected.

Figure 8:
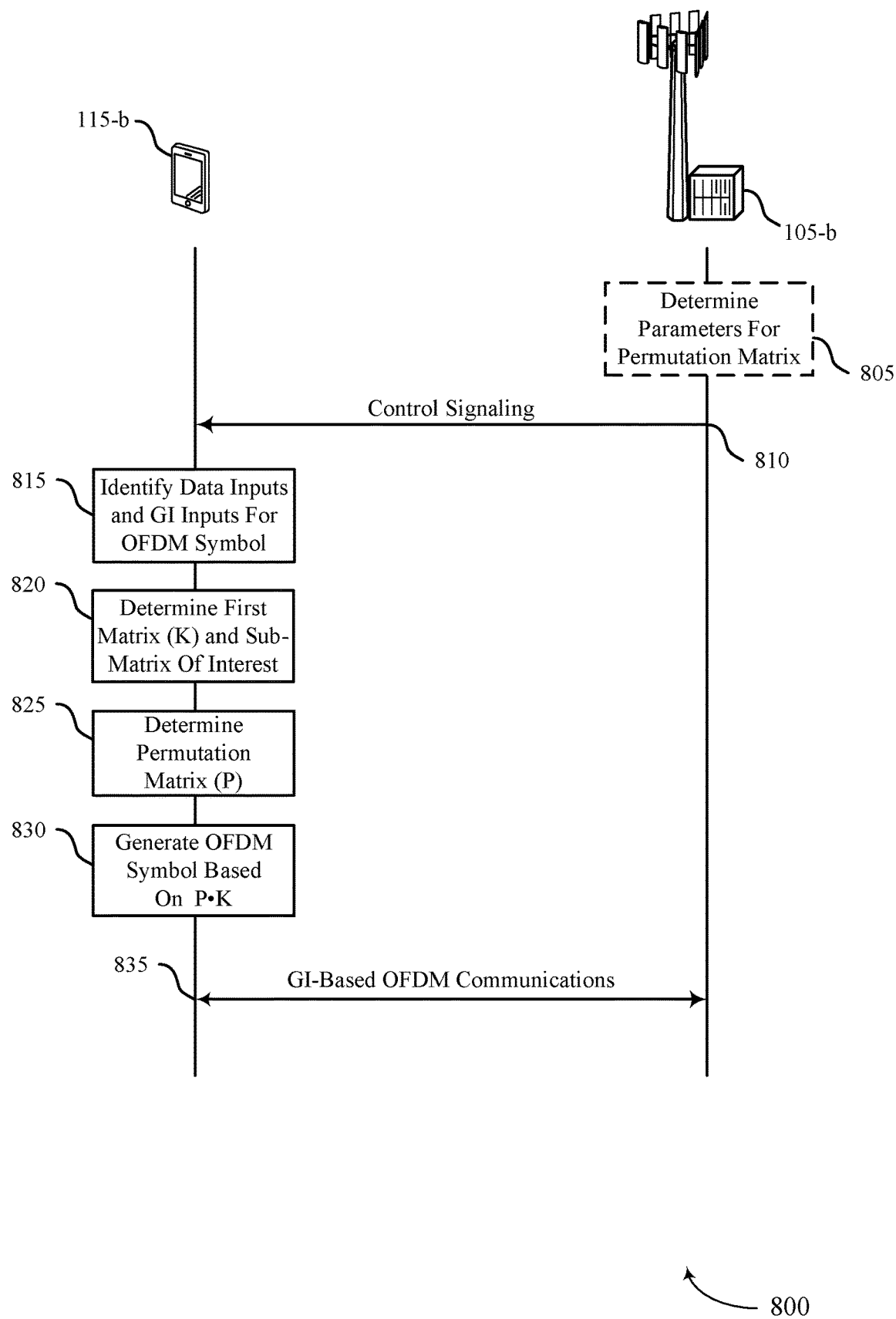
FIG. 8 illustrates an example of a process flow that supports subcarrier mapping techniques for GI-based OFDM communications in accordance with aspects of the present disclosure.

FIG. 8 illustrates an example of a process flow 800 that supports subcarrier mapping techniques for GI-based OFDM communications in accordance with aspects of the present disclosure. The process flow 800 may include various aspects of the present disclosure described with reference to FIGS. 1 through 7. For example, the process flow 800 may illustrate communications between a UE 115-b and a base station 105-b, which may be examples of corresponding devices as described with reference to FIGS. 1 through 8. In some examples, the base station 105-b may transmit a configuration for one or more symbol structures, permutation matrix selection techniques, permutation matrix parameters, or any combinations thereof, to the UE 115-b to support reduced latency, complexity, and improved communication reliability. Alternative examples of the following may be implemented, where some steps are performed in a different order than described or are not performed at all. In some cases, a step may include additional features not mentioned below, or further steps may be added.

At 805, the base station 105-b optionally may determine one or more parameters for a permutation matrix. The one or more parameters may include, for example, a selection technique for selecting columns from a sub-matrix of interest from a first matrix (e.g., a first matrix K as discussed herein), and parameters for the selection based on the indicated technique.

At 810, the base station 105-b may transmit control signaling to the UE 115-b. The control signaling may provide control information that indicates, for example, the one or more parameters for the permutation matrix, a technique for determining the permutation matrix, a GI-based OFDM symbol structure, or any combinations thereof. In some cases, the control information may also indicate one or more of a GI length, or GI type, for one or multiple subsets of symbols. In some cases, the GI type indicates a header GI in which a GI precedes data within a symbol, a tail GI in which data precedes a GI within the symbol, both a header and tail GI, or that no GI is present in a symbol. Further, in some cases, the GI type indicates a ZH, ZT, or UW GI, a GI generation technique, or any combinations thereof. In some cases, the control signaling is provided in one or more of RRC signaling, a MAC-CE, DCI, or any combinations thereof.

At 815, the UE 115-b may identify data inputs and GI inputs for an OFDM symbol. The data inputs may correspond to a number of data bits that are to be transmitted in the OFDM symbol, and the GI inputs may be based on a type of GI (e.g., header GI, tail GI, or head/tail GI), a UW that is to be included in the GI, a GI length, or any combinations thereof.

At 820, the UE 115-b may determine the first matrix (K) and a sub-matrix of interest (Z) of the first matrix. In some cases, the first matrix may be a product of an IFFT matrix and a subcarrier mapping matrix (e.g., $K=F_{Nfft}^{-1}B$). In other cases, first matrix may correspond to the IFFT matrix (e.g., $K=F_{Nfft}^{-1}$).

At 825, the UE 115-b may determine the permutation matrix (P). In some cases, the permutation matrix (P) may be determined based on a subset of columns identified in the sub-matrix of interest (Z), such as discussed with reference to FIGS. 5 through 7. At 830, the UE 115-b may generate the OFDM symbol based on the permutation matrix and the first matrix (e.g., based on $F_{Nfft}^{-1}BP$). At 835, the UE 115-b and base station 105-b may communicate using GI-based OFDM communications, in which the OFDM symbols are generated based on a technique as discussed herein that provides a suitable transmit power across the OFDM symbol.

Figure 9:
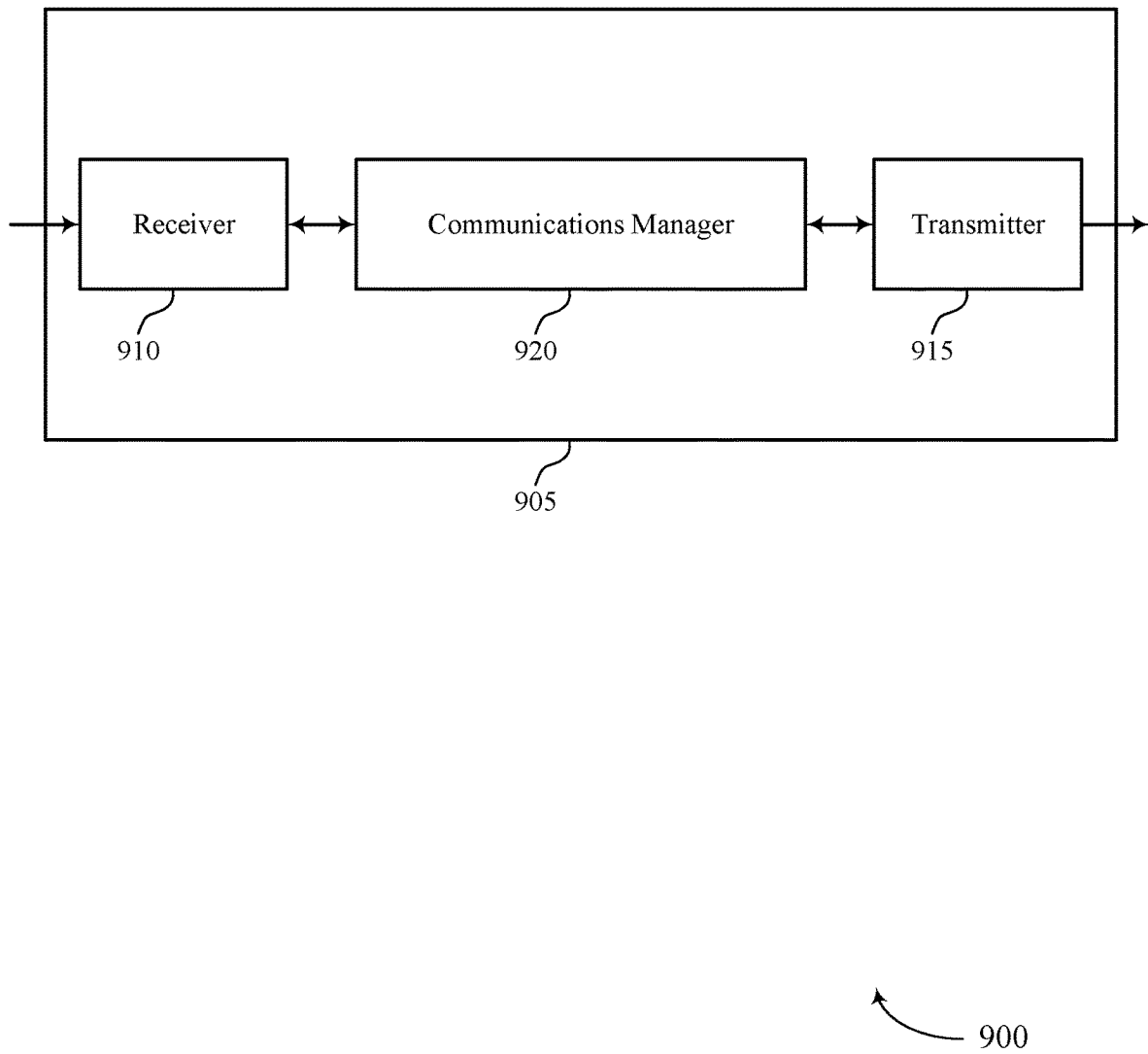
FIGS. 9 and 10 show block diagrams of devices that support subcarrier mapping techniques for GI-based OFDM communications in accordance with aspects of the present disclosure.

FIG. 9 shows a block diagram 900 of a device 905 that supports subcarrier mapping techniques for GI-based OFDM communications in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to subcarrier mapping techniques for GI-based OFDM communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to subcarrier mapping techniques for GI-based OFDM communications). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of subcarrier mapping techniques for GI-based OFDM communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a transmitting device in accordance with examples as disclosed herein. For example, the communications manager 920 may be configured as or otherwise support a means for identifying a first set of GI inputs and a second set of data inputs for an OFDM communication, where the OFDM communication has a first set of time-domain GI samples and a second set of time-domain data samples. The communications manager 920 may be configured as or otherwise support a means for determining a permutation matrix to map the first set of GI inputs to a subset of a set of subcarriers for the OFDM communication, the permutation matrix determined based on a first number of columns of a sub-matrix of a first matrix, where the first matrix is based on an IFFT matrix that is used to generate an OFDM symbol of the OFDM communication, and where the first number of columns correspond to a number of subcarriers that carry the first set of time-domain GI samples. The communications manager 920 may be configured as or otherwise support a means for generating the OFDM symbol with the first set of time-domain GI samples and the second set of time-domain data samples based on a product of the permutation matrix and the first matrix applied to the first set of GI inputs and the second set of data inputs. The communications manager 920 may be configured as or otherwise support a means for transmitting the OFDM symbol to a receiving device.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for determination of a permutation matrix with acceptable power properties for GI-based OFDM that provide suitable power properties with relatively low amounts of memory and processing resources, which may provide reduced power consumption and more efficient utilization of communication resources.

Figure 10:
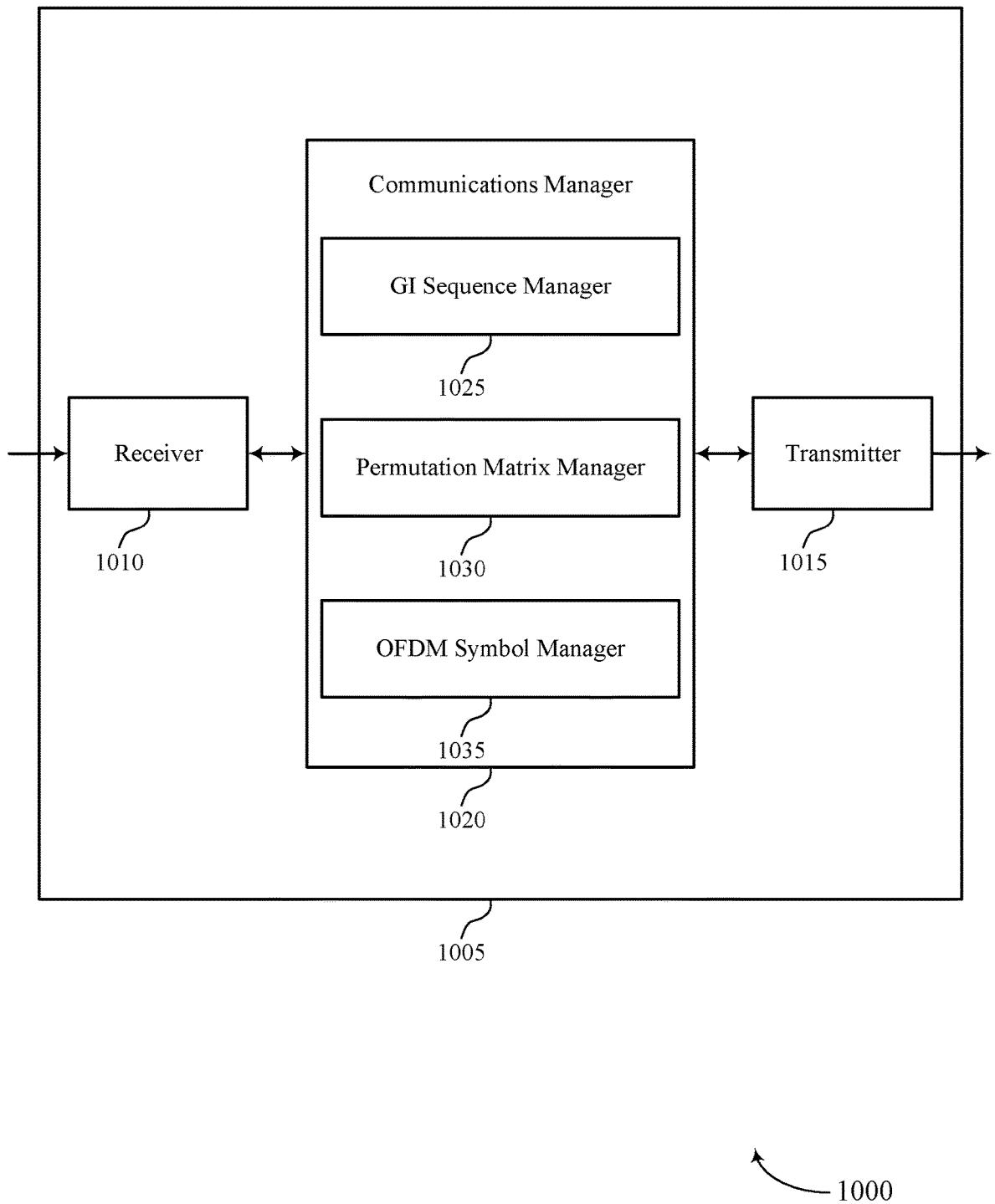

FIG. 10 shows a block diagram 1000 of a device 1005 that supports subcarrier mapping techniques for GI-based OFDM communications in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to subcarrier mapping techniques for GI-based OFDM communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to subcarrier mapping techniques for GI-based OFDM communications). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of subcarrier mapping techniques for GI-based OFDM communications as described herein. For example, the communications manager 1020 may include a GI sequence manager 1025, a permutation matrix manager 1030, an OFDM symbol manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a transmitting device in accordance with examples as disclosed herein. The GI sequence manager 1025 may be configured as or otherwise support a means for identifying a first set of GI inputs and a second set of data inputs for an OFDM communication, where the OFDM communication has a first set of time-domain GI samples and a second set of time-domain data samples. The permutation matrix manager 1030 may be configured as or otherwise support a means for determining a permutation matrix to map the first set of GI inputs to a subset of a set of subcarriers for the OFDM communication, the permutation matrix determined based on a first number of columns of a sub-matrix of a first matrix, where the first matrix is based on an IFFT matrix that is used to generate an OFDM symbol of the OFDM communication, and where the first number of columns correspond to a number of subcarriers that carry the first set of time-domain GI samples. The OFDM symbol manager 1035 may be configured as or otherwise support a means for generating the OFDM symbol with the first set of time-domain GI samples and the second set of time-domain data samples based on a product of the permutation matrix and the first matrix applied to the first set of GI inputs and the second set of data inputs. The OFDM symbol manager 1035 may be configured as or otherwise support a means for transmitting the OFDM symbol to a receiving device.

Figure 11:
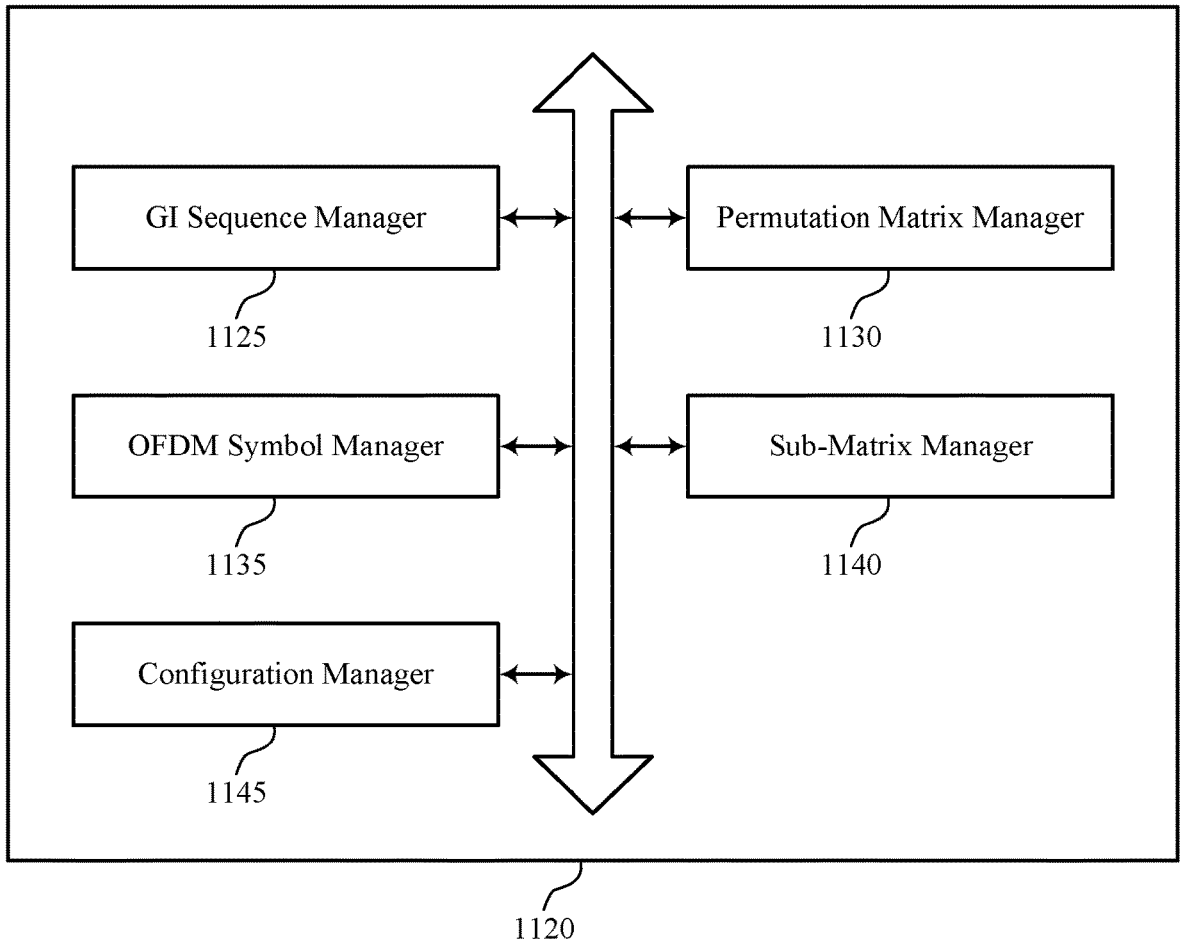
FIG. 11 shows a block diagram of a communications manager that supports subcarrier mapping techniques for GI-based OFDM communications in accordance with aspects of the present disclosure.

FIG. 11 shows a block diagram 1100 of a communications manager 1120 that supports subcarrier mapping techniques for GI-based OFDM communications in accordance with aspects of the present disclosure. The communications manager 1120 may be an example of aspects of a communications manager 920, a communications manager 1020, or both, as described herein. The communications manager 1120, or various components thereof, may be an example of means for performing various aspects of subcarrier mapping techniques for GI-based OFDM communications as described herein. For example, the communications manager 1120 may include a GI sequence manager 1125, a permutation matrix manager 1130, an OFDM symbol manager 1135, a sub-matrix manager 1140, a configuration manager 1145, or any combination thereof. Each of these components may communicate, directly or indirectly, with one another (e.g., via one or more buses).

The communications manager 1120 may support wireless communication at a transmitting device in accordance with examples as disclosed herein. The GI sequence manager 1125 may be configured as or otherwise support a means for identifying a first set of GI inputs and a second set of data inputs for an OFDM communication, where the OFDM communication has a first set of time-domain GI samples and a second set of time-domain data samples. The permutation matrix manager 1130 may be configured as or otherwise support a means for determining a permutation matrix to map the first set of GI inputs to a subset of a set of subcarriers for the OFDM communication, the permutation matrix determined based on a first number of columns of a sub-matrix of a first matrix, where the first matrix is based on an IFFT matrix that is used to generate an OFDM symbol of the OFDM communication, and where the first number of columns correspond to a number of subcarriers that carry the first set of time-domain GI samples. The OFDM symbol manager 1135 may be configured as or otherwise support a means for generating the OFDM symbol with the first set of time-domain GI samples and the second set of time-domain data samples based on a product of the permutation matrix and the first matrix applied to the first set of GI inputs and the second set of data inputs. In some examples, the OFDM symbol manager 1135 may be configured as or otherwise support a means for transmitting the OFDM symbol to a receiving device.

In some examples, the sub-matrix manager 1140 may be configured as or otherwise support a means for identifying the sub-matrix of the first matrix based on a number of rows that correspond to a sum of a first number of GI header samples of the first set of time-domain GI samples and a second number of GI tail samples of the first set of time-domain GI samples, and a number of columns that correspond to the number of subcarriers that carry the first set of time-domain GI samples. In some examples, the IFFT matrix has a length that corresponds to a sum of a first number of time-domain GI samples of the first set of time-domain GI samples and a second number of time-domain data samples of the second set of time-domain data samples.

In some examples, the configuration manager 1145 may be configured as or otherwise support a means for receiving, from a base station, configuration information that indicates the permutation matrix is to be used to generate the OFDM symbol that includes the first set of time-domain GI samples. In some examples, the permutation matrix is determined based on one or more parameters that are specified, that are included with the configuration information, that are determined based on one or more conditions associated with the OFDM symbol, or any combinations thereof.

In some examples, to support receiving the configuration information, the configuration manager 1145 may be configured as or otherwise support a means for receiving one or more parameters for determination of the permutation matrix via RRC signaling, a medium access control (MAC) control element, DCI, or any combinations thereof. In some examples, the first number of columns of the sub-matrix are selected as quasi-equidistant columns from a total number of columns of the first matrix. In some examples, the first matrix is a product of the IFFT matrix and a sub-carrier mapping matrix, and the sub-matrix includes columns of the first matrix that correspond to a subset of active subcarriers for the OFDM symbol that do not include guard subcarriers associated with a guard band of the OFDM symbol. In some examples, the first matrix corresponds to the IFFT matrix, and the sub-matrix includes columns of the first matrix that correspond to all subcarriers for the OFDM symbol including guard subcarriers associated with a guard band of the OFDM symbol, and one or more columns of the sub-matrix that are associated with the guard subcarriers are discarded.

In some examples, to support determining the permutation matrix, the permutation matrix manager 1130 may be configured as or otherwise support a means for performing a QR decomposition with column pivoting on the sub-matrix to determine an ordered set of columns that are ordered according to linear independence. In some examples, to support determining the permutation matrix, the permutation matrix manager 1130 may be configured as or otherwise support a means for selecting the first number of columns from the ordered set of columns. In some examples, the first matrix is a product of the IFFT matrix and a sub-carrier mapping matrix, and the first number of columns are selected in sequential order from an initial column of the ordered set of columns. In some examples, the first matrix corresponds to the IFFT matrix and a first subset of columns of the ordered set of columns are associated with one or more guard subcarriers for the OFDM symbol, and a second subset of columns of the ordered set of columns are associated with one or more non-guard subcarriers for the OFDM symbol, and where the first number of columns are selected in sequential order from the second subset of columns.

Figure 12:
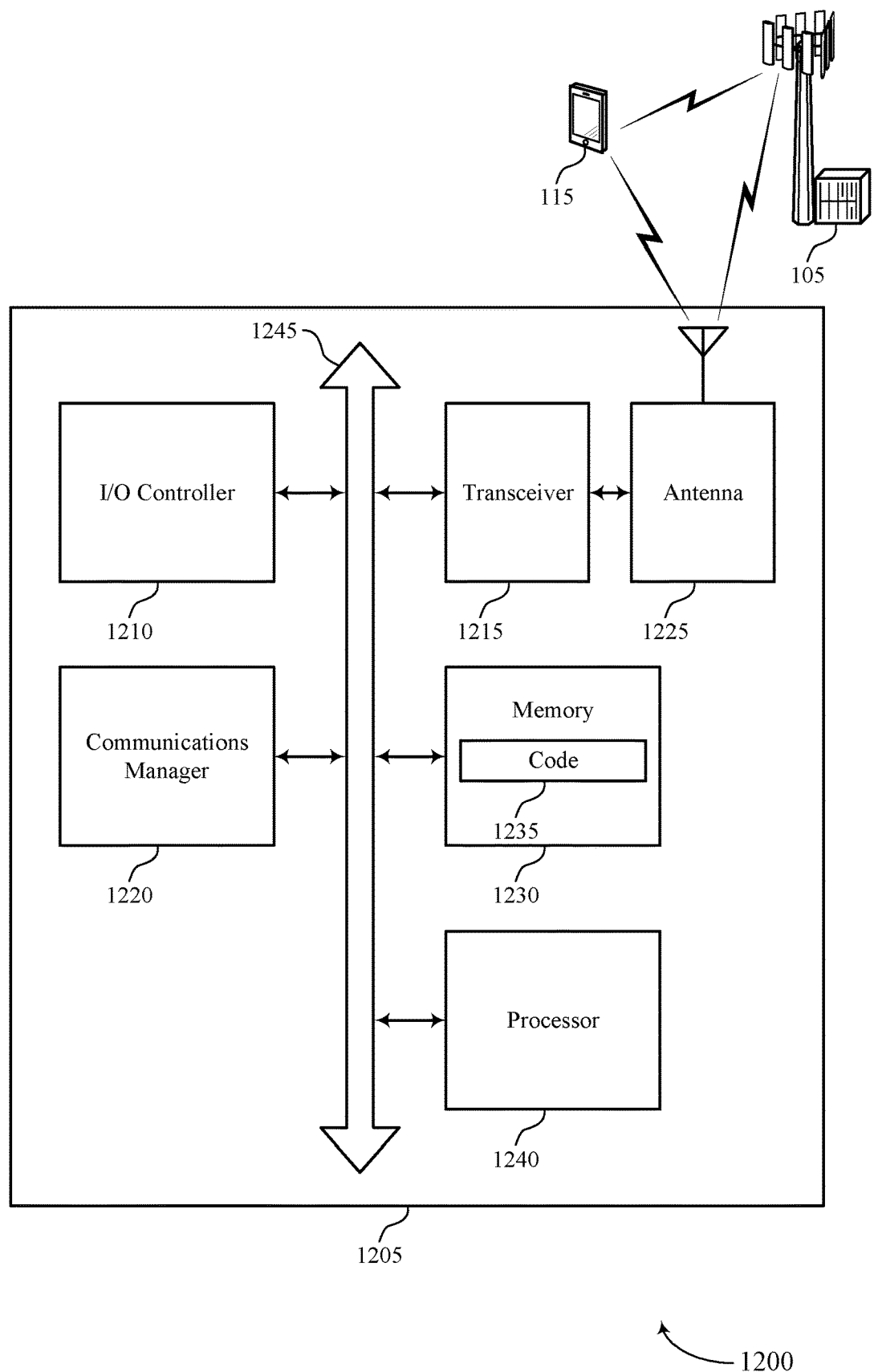
FIG. 12 shows a diagram of a system including a device that supports subcarrier mapping techniques for GI-based OFDM communications in accordance with aspects of the present disclosure.

FIG. 12 shows a diagram of a system 1200 including a device 1205 that supports subcarrier mapping techniques for GI-based OFDM communications in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting subcarrier mapping techniques for GI-based OFDM communications). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a transmitting device in accordance with examples as disclosed herein. For example, the communications manager 1220 may be configured as or otherwise support a means for identifying a first set of GI inputs and a second set of data inputs for an OFDM communication, where the OFDM communication has a first set of time-domain GI samples and a second set of time-domain data samples. The communications manager 1220 may be configured as or otherwise support a means for determining a permutation matrix to map the first set of GI inputs to a subset of a set of subcarriers for the OFDM communication, the permutation matrix determined based on a first number of columns of a sub-matrix of a first matrix, where the first matrix is based on an IFFT matrix that is used to generate an OFDM symbol of the OFDM communication, and where the first number of columns correspond to a number of subcarriers that carry the first set of time-domain GI samples. The communications manager 1220 may be configured as or otherwise support a means for generating the OFDM symbol with the first set of time-domain GI samples and the second set of time-domain data samples based on a product of the permutation matrix and the first matrix applied to the first set of GI inputs and the second set of data inputs. The communications manager 1220 may be configured as or otherwise support a means for transmitting the OFDM symbol to a receiving device.

By including or configuring the communications manager 1220 in accordance with examples as described herein, the device 1205 may support techniques for determination of a permutation matrix with acceptable power properties for GI-based OFDM that provide suitable power properties with relatively low amounts of memory and processing resources, which may provide reduced power consumption and more efficient utilization of communication resources.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of subcarrier mapping techniques for GI-based OFDM communications as described herein, or the processor 1240 and the memory 1230 may be otherwise configured to perform or support such operations.

Figure 13:
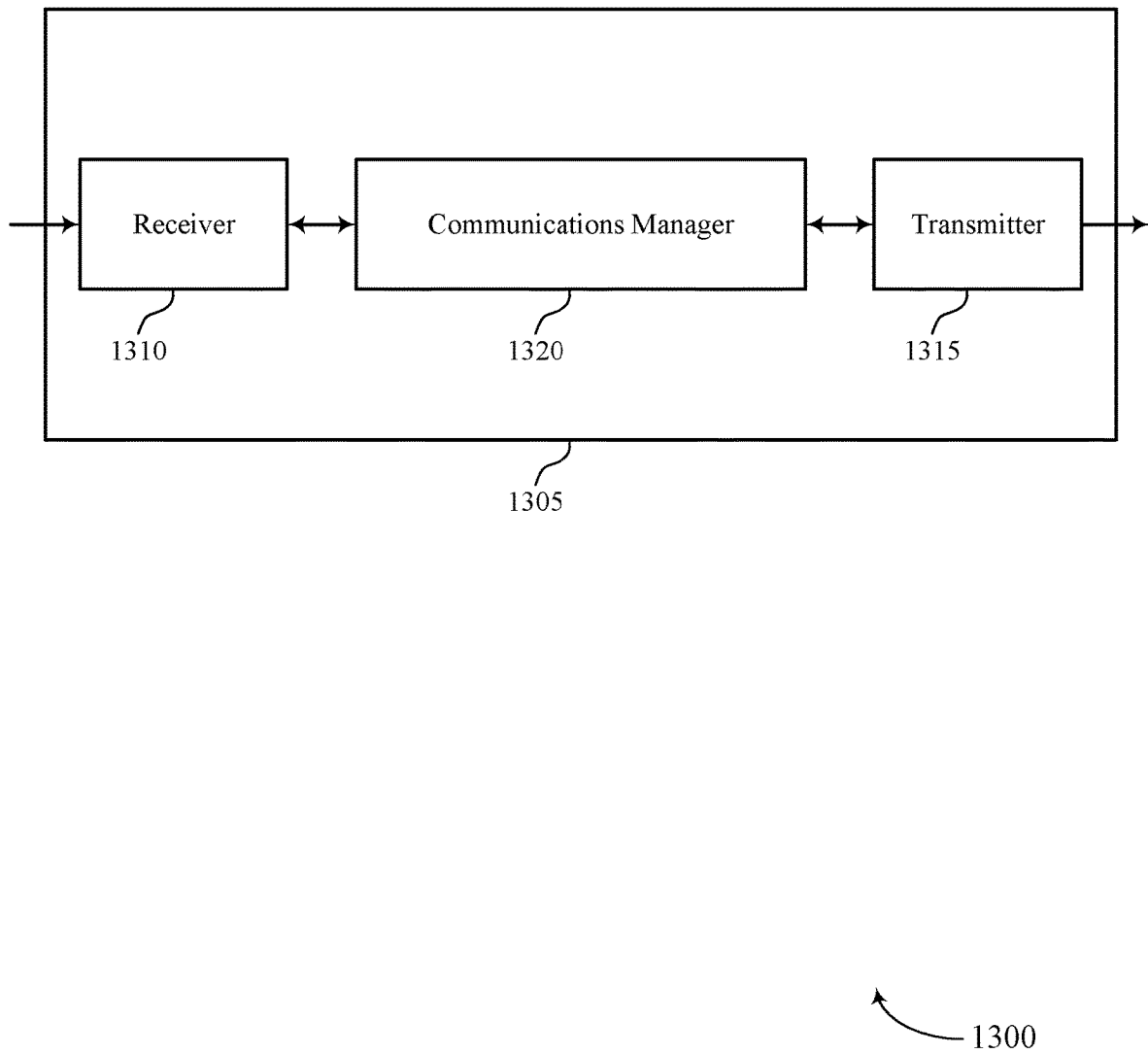
FIGS. 13 and 14 show block diagrams of devices that support subcarrier mapping techniques for GI-based OFDM communications in accordance with aspects of the present disclosure.

FIG. 13 shows a block diagram 1300 of a device 1305 that supports subcarrier mapping techniques for GI-based OFDM communications in accordance with aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to subcarrier mapping techniques for GI-based OFDM communications). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to subcarrier mapping techniques for GI-based OFDM communications). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of subcarrier mapping techniques for GI-based OFDM communications as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a transmitting device in accordance with examples as disclosed herein. For example, the communications manager 1320 may be configured as or otherwise support a means for identifying a first set of GI inputs and a second set of data inputs for an OFDM communication, where the OFDM communication has a first set of time-domain GI samples and a second set of time-domain data samples. The communications manager 1320 may be configured as or otherwise support a means for determining a permutation matrix to map the first set of GI inputs to a subset of a set of subcarriers for the OFDM communication, the permutation matrix determined based on a first number of columns of a sub-matrix of a first matrix, where the first matrix is based on an IFFT matrix that is used to generate an OFDM symbol of the OFDM communication, and where the first number of columns correspond to a number of subcarriers that carry the first set of time-domain GI samples. The communications manager 1320 may be configured as or otherwise support a means for generating the OFDM symbol with the first set of time-domain GI samples and the second set of time-domain data samples based on a product of the permutation matrix and the first matrix applied to the first set of GI inputs and the second set of data inputs. The communications manager 1320 may be configured as or otherwise support a means for transmitting the OFDM symbol to a receiving device.

Additionally or alternatively, the communications manager 1320 may support wireless communication at a base station in accordance with examples as disclosed herein. For example, the communications manager 1320 may be configured as or otherwise support a means for determining configuration information for a first transmitter for OFDM communication, where the configuration information indicates that OFDM symbols within the OFDM communication include a first set of time-domain GI samples and a second set of time-domain data samples, and a permutation matrix is to be used to map a first set of GI inputs to a subset of a set of subcarriers for the OFDM communication. The communications manager 1320 may be configured as or otherwise support a means for transmitting the configuration information to the first transmitter. The communications manager 1320 may be configured as or otherwise support a means for communicating with the first transmitter using guard-interval-based OFDM communications based on the configuration information.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for determination of a permutation matrix with acceptable power properties for GI-based OFDM that provide suitable power properties with relatively low amounts of memory and processing resources, which may provide reduced power consumption and more efficient utilization of communication resources.

Figure 14:
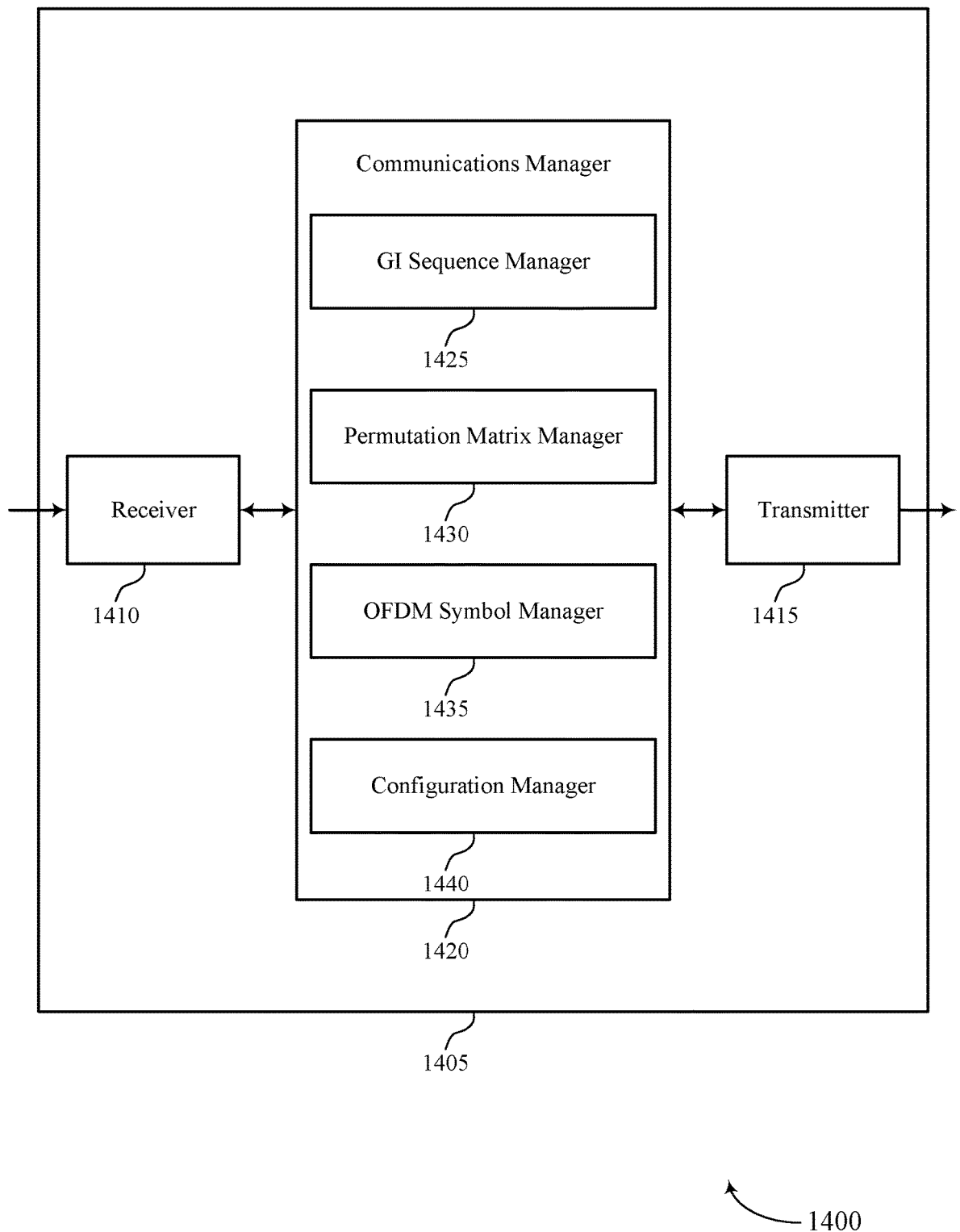

FIG. 14 shows a block diagram 1400 of a device 1405 that supports subcarrier mapping techniques for GI-based OFDM communications in accordance with aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to subcarrier mapping techniques for GI-based OFDM communications). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to subcarrier mapping techniques for GI-based OFDM communications). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of subcarrier mapping techniques for GI-based OFDM communications as described herein. For example, the communications manager 1420 may include a GI sequence manager 1425, a permutation matrix manager 1430, an OFDM symbol manager 1435, a configuration manager 1440, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a transmitting device in accordance with examples as disclosed herein. The GI sequence manager 1425 may be configured as or otherwise support a means for identifying a first set of GI inputs and a second set of data inputs for an OFDM communication, where the OFDM communication has a first set of time-domain GI samples and a second set of time-domain data samples. The permutation matrix manager 1430 may be configured as or otherwise support a means for determining a permutation matrix to map the first set of GI inputs to a subset of a set of subcarriers for the OFDM communication, the permutation matrix determined based on a first number of columns of a sub-matrix of a first matrix, where the first matrix is based on an IFFT matrix that is used to generate an OFDM symbol of the OFDM communication, and where the first number of columns correspond to a number of subcarriers that carry the first set of time-domain GI samples. The OFDM symbol manager 1435 may be configured as or otherwise support a means for generating the OFDM symbol with the first set of time-domain GI samples and the second set of time-domain data samples based on a product of the permutation matrix and the first matrix applied to the first set of GI inputs and the second set of data inputs. The OFDM symbol manager 1435 may be configured as or otherwise support a means for transmitting the OFDM symbol to a receiving device.

Additionally or alternatively, the communications manager 1420 may support wireless communication at a base station in accordance with examples as disclosed herein. The GI sequence manager 1425 may be configured as or otherwise support a means for determining configuration information for a first transmitter for OFDM communication, where the configuration information indicates that OFDM symbols within the OFDM communication include a first set of time-domain GI samples and a second set of time-domain data samples, and a permutation matrix is to be used to map a first set of GI inputs to a subset of a set of subcarriers for the OFDM communication. The configuration manager 1440 may be configured as or otherwise support a means for transmitting the configuration information to the first transmitter. The OFDM symbol manager 1435 may be configured as or otherwise support a means for communicating with the first transmitter using guard-interval-based OFDM communications based on the configuration information.

Figure 15:
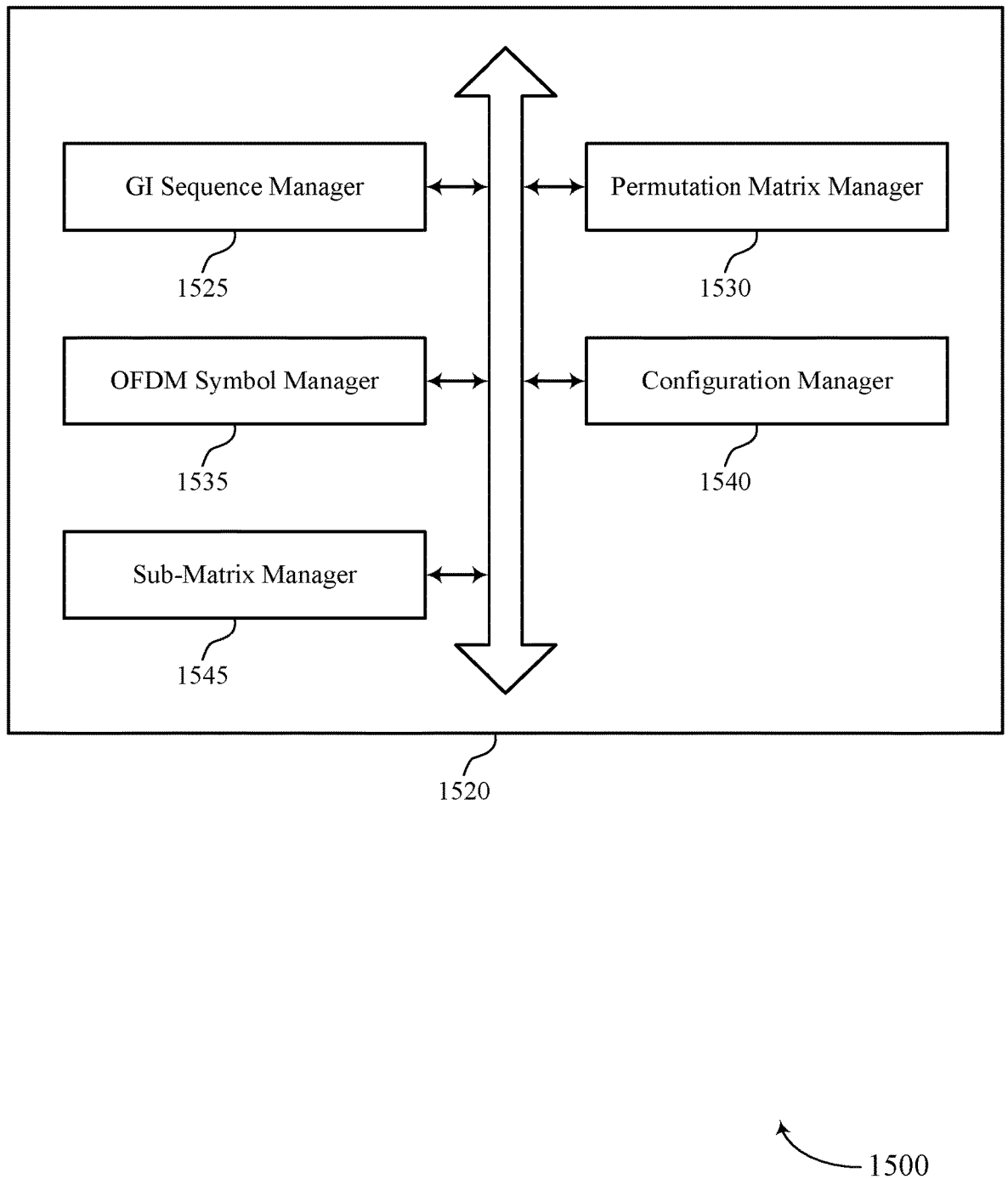
FIG. 15 shows a block diagram of a communications manager that supports subcarrier mapping techniques for GI-based OFDM communications in accordance with aspects of the present disclosure.

FIG. 15 shows a block diagram 1500 of a communications manager 1520 that supports subcarrier mapping techniques for GI-based OFDM communications in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of subcarrier mapping techniques for GI-based OFDM communications as described herein. For example, the communications manager 1520 may include a GI sequence manager 1525, a permutation matrix manager 1530, an OFDM symbol manager 1535, a configuration manager 1540, a sub-matrix manager 1545, or any combination thereof. Each of these components may communicate, directly or indirectly, with one another (e.g., via one or more buses).

The communications manager 1520 may support wireless communication at a transmitting device in accordance with examples as disclosed herein. The GI sequence manager 1525 may be configured as or otherwise support a means for identifying a first set of GI inputs and a second set of data inputs for an OFDM communication, where the OFDM communication has a first set of time-domain GI samples and a second set of time-domain data samples. The permutation matrix manager 1530 may be configured as or otherwise support a means for determining a permutation matrix to map the first set of GI inputs to a subset of a set of subcarriers for the OFDM communication, the permutation matrix determined based on a first number of columns of a sub-matrix of a first matrix, where the first matrix is based on an IFFT matrix that is used to generate an OFDM symbol of the OFDM communication, and where the first number of columns correspond to a number of subcarriers that carry the first set of time-domain GI samples. The OFDM symbol manager 1535 may be configured as or otherwise support a means for generating the OFDM symbol with the first set of time-domain GI samples and the second set of time-domain data samples based on a product of the permutation matrix and the first matrix applied to the first set of GI inputs and the second set of data inputs. In some examples, the OFDM symbol manager 1535 may be configured as or otherwise support a means for transmitting the OFDM symbol to a receiving device.

In some examples, the sub-matrix manager 1545 may be configured as or otherwise support a means for identifying the sub-matrix of the first matrix based on a number of rows that correspond to a sum of a first number of GI header samples of the first set of time-domain GI samples and a second number of GI tail samples of the first set of time-domain GI samples, and a number of columns that correspond to the number of subcarriers that carry the first set of time-domain GI samples. In some examples, the IFFT matrix has a length that corresponds to a sum of a first number of time-domain GI samples of the first set of time-domain GI samples and a second number of time-domain data samples of the second set of time-domain data samples.

In some examples, the configuration manager 1540 may be configured as or otherwise support a means for receiving, from a base station, configuration information that indicates the permutation matrix is to be used to generate the OFDM symbol that includes the first set of time-domain GI samples. In some examples, the permutation matrix is determined based on one or more parameters that are specified, that are included with the configuration information, that are determined based on one or more conditions associated with the OFDM symbol, or any combinations thereof.

In some examples, to support receiving the configuration information, the configuration manager 1540 may be configured as or otherwise support a means for receiving one or more parameters for determination of the permutation matrix via RRC signaling, a medium access control (MAC) control element, DCI, or any combinations thereof. In some examples, the first number of columns of the sub-matrix are selected as quasi-equidistant columns from a total number of columns of the first matrix. In some examples, the first matrix is a product of the IFFT matrix and a sub-carrier mapping matrix, and the sub-matrix includes columns of the first matrix that correspond to a subset of active subcarriers for the OFDM symbol that do not include guard subcarriers associated with a guard band of the OFDM symbol. In some examples, the first matrix corresponds to the IFFT matrix, and the sub-matrix includes columns of the first matrix that correspond to all subcarriers for the OFDM symbol including guard subcarriers associated with a guard band of the OFDM symbol, and one or more columns of the sub-matrix that are associated with the guard subcarriers are discarded.

In some examples, to support determining the permutation matrix, the permutation matrix manager 1530 may be configured as or otherwise support a means for performing a QR decomposition with column pivoting on the sub-matrix to determine an ordered set of columns that are ordered according to linear independence. In some examples, to support determining the permutation matrix, the permutation matrix manager 1530 may be configured as or otherwise support a means for selecting the first number of columns from the ordered set of columns. In some examples, the first matrix is a product of the IFFT matrix and a sub-carrier mapping matrix, and the first number of columns are selected in sequential order from an initial column of the ordered set of columns. In some examples, the first matrix corresponds to the IFFT matrix and a first subset of columns of the ordered set of columns are associated with one or more guard subcarriers for the OFDM symbol, and a second subset of columns of the ordered set of columns are associated with one or more non-guard subcarriers for the OFDM symbol, and where the first number of columns are selected in sequential order from the second subset of columns.

Additionally or alternatively, the communications manager 1520 may support wireless communication at a base station in accordance with examples as disclosed herein. In some examples, the GI sequence manager 1525 may be configured as or otherwise support a means for determining configuration information for a first transmitter for OFDM communication, where the configuration information indicates that OFDM symbols within the OFDM communication include a first set of time-domain GI samples and a second set of time-domain data samples, and a permutation matrix is to be used to map a first set of GI inputs to a subset of a set of subcarriers for the OFDM communication. The configuration manager 1540 may be configured as or otherwise support a means for transmitting the configuration information to the first transmitter. In some examples, the OFDM symbol manager 1535 may be configured as or otherwise support a means for communicating with the first transmitter using guard-interval-based OFDM communications based on the configuration information.

In some examples, one or more parameters for generating the permutation matrix are specified, are transmitted in the configuration information, are implicitly derived based on conditions associated with the OFDM communication, or any combinations thereof. In some examples, the one or more parameters for generating the permutation matrix are provided in RRC signaling, in a medium access control (MAC) control element, in DCI, or any combinations thereof. In some examples, the permutation matrix is based on a first number of columns of a sub-matrix of a first matrix, where the first matrix is based on an IFFT matrix that is used to generate an OFDM symbol of the OFDM communication, and where the first number of columns correspond to a number of subcarriers that carry the first set of time-domain GI samples. In some examples, the first number of columns of the sub-matrix are selected as quasi-equidistant columns from a total number of columns of the first matrix. In some examples, the first matrix is a product of the IFFT matrix and a sub-carrier mapping matrix, and the sub-matrix includes columns of the first matrix that correspond to a subset of active subcarriers for the OFDM symbol that do not include guard subcarriers associated with a guard band of the OFDM symbol.

In some examples, the first matrix corresponds to the IFFT matrix, and the sub-matrix includes columns of the first matrix that correspond to all subcarriers for the OFDM symbol including guard subcarriers associated with a guard band of the OFDM symbol, and one or more columns of the sub-matrix that are associated with the guard subcarriers are discarded. In some examples, the first number of columns of the sub-matrix are selected by performing a QR decomposition with column pivoting on the sub-matrix to determine an ordered set of columns that are ordered according to linear independence, and selecting the first number of columns from the ordered set of columns. In some examples, the first matrix is a product of the IFFT matrix and a sub-carrier mapping matrix, and the first number of columns are selected in sequential order from an initial column of the ordered set of columns. In some examples, the first matrix corresponds to the IFFT matrix and a first subset of columns of the ordered set of columns are associated with one or more guard subcarriers for the OFDM symbol, and a second subset of columns of the ordered set of columns are associated with one or more non-guard subcarriers for the OFDM symbol, and where the first number of columns are selected in sequential order from the second subset of columns.

Figure 16:
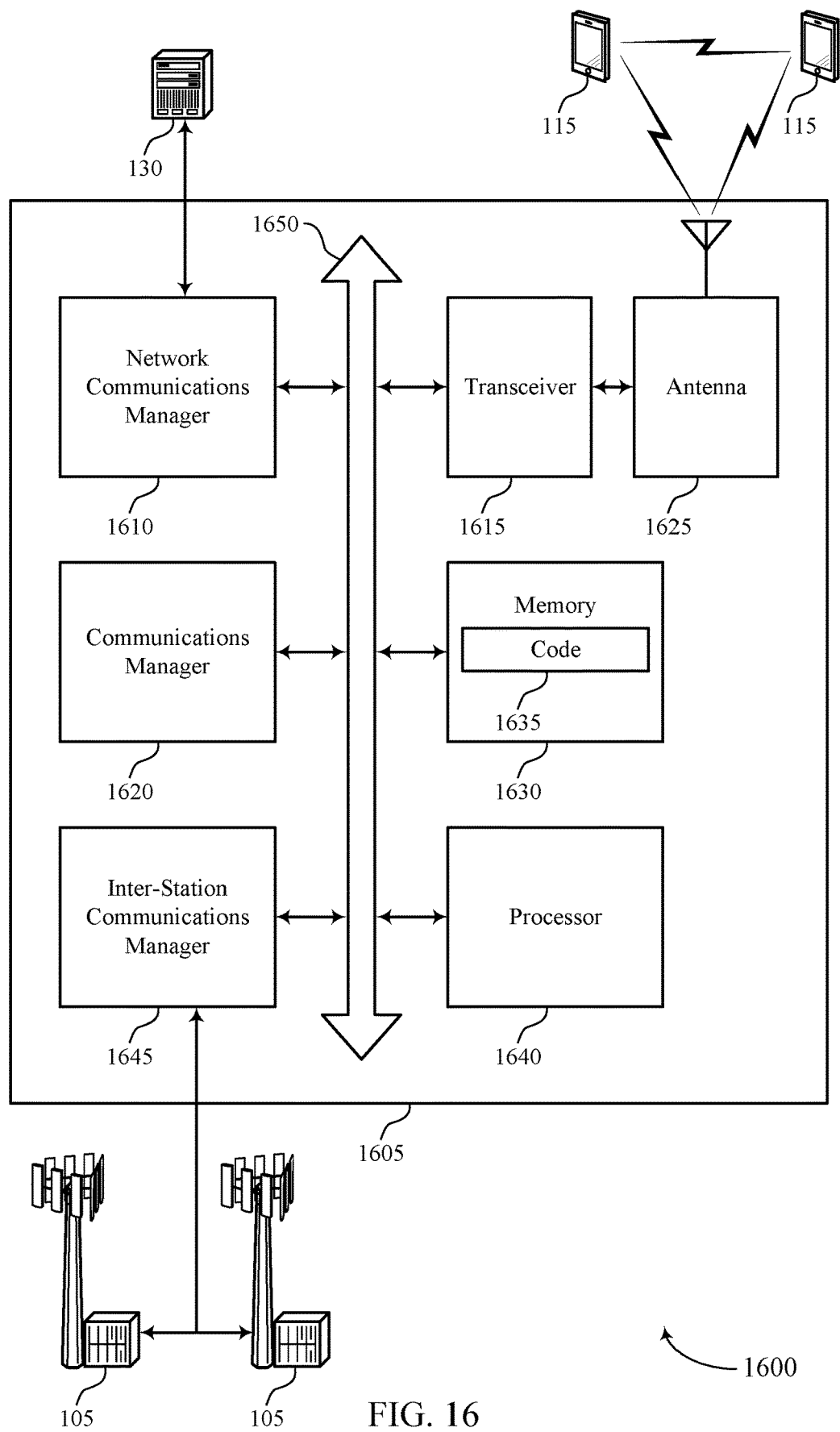
FIG. 16 shows a diagram of a system including a device that supports subcarrier mapping techniques for GI-based OFDM communications in accordance with aspects of the present disclosure.

FIG. 16 shows a diagram of a system 1600 including a device 1605 that supports subcarrier mapping techniques for GI-based OFDM communications in accordance with aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting subcarrier mapping techniques for GI-based OFDM communications). For example, the device 1605 or a component of the device 1605 may include a processor 1640 and memory 1630 coupled with or to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communication at a transmitting device in accordance with examples as disclosed herein. For example, the communications manager 1620 may be configured as or otherwise support a means for identifying a first set of GI inputs and a second set of data inputs for an OFDM communication, where the OFDM communication has a first set of time-domain GI samples and a second set of time-domain data samples. The communications manager 1620 may be configured as or otherwise support a means for determining a permutation matrix to map the first set of GI inputs to a subset of a set of subcarriers for the OFDM communication, the permutation matrix determined based on a first number of columns of a sub-matrix of a first matrix, where the first matrix is based on an IFFT matrix that is used to generate an OFDM symbol of the OFDM communication, and where the first number of columns correspond to a number of subcarriers that carry the first set of time-domain GI samples. The communications manager 1620 may be configured as or otherwise support a means for generating the OFDM symbol with the first set of time-domain GI samples and the second set of time-domain data samples based on a product of the permutation matrix and the first matrix applied to the first set of GI inputs and the second set of data inputs. The communications manager 1620 may be configured as or otherwise support a means for transmitting the OFDM symbol to a receiving device.

Additionally or alternatively, the communications manager 1620 may support wireless communication at a base station in accordance with examples as disclosed herein. For example, the communications manager 1620 may be configured as or otherwise support a means for determining configuration information for a first transmitter for OFDM communication, where the configuration information indicates that OFDM symbols within the OFDM communication include a first set of time-domain GI samples and a second set of time-domain data samples, and a permutation matrix is to be used to map a first set of GI inputs to a subset of a set of subcarriers for the OFDM communication. The communications manager 1620 may be configured as or otherwise support a means for transmitting the configuration information to the first transmitter. The communications manager 1620 may be configured as or otherwise support a means for communicating with the first transmitter using guard-interval-based OFDM communications based on the configuration information.

By including or configuring the communications manager 1620 in accordance with examples as described herein, the device 1605 may support techniques for determination of a permutation matrix with acceptable power properties for GI-based OFDM that provide suitable power properties with relatively low amounts of memory and processing resources, which may provide reduced power consumption and more efficient utilization of communication resources.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of subcarrier mapping techniques for GI-based OFDM communications as described herein, or the processor 1640 and the memory 1630 may be otherwise configured to perform or support such operations.

Figure 17:
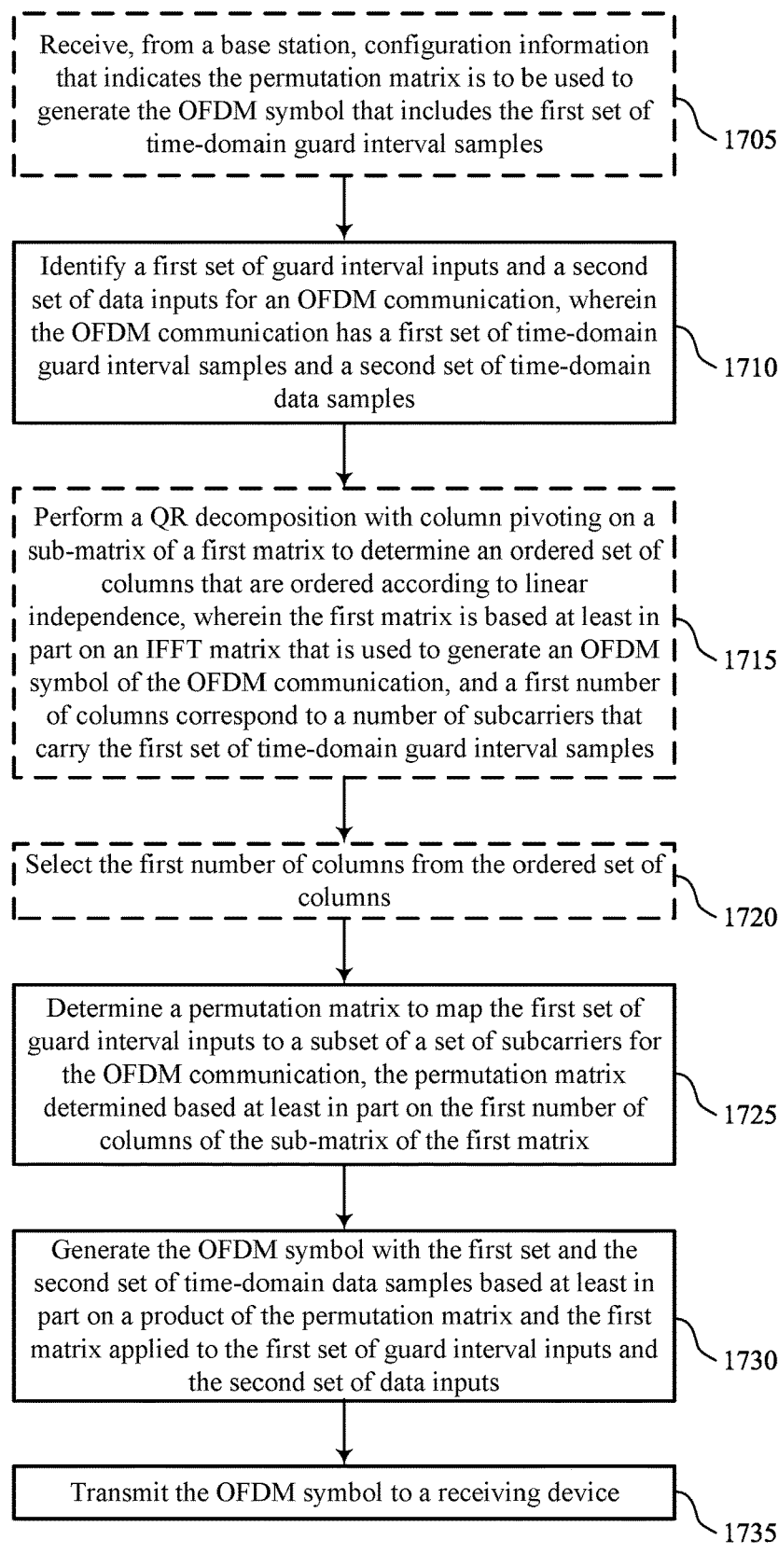
FIGS. 17 through 19 show flowcharts illustrating methods that support subcarrier mapping techniques for GI-based OFDM communications in accordance with aspects of the present disclosure.

FIG. 17 shows a flowchart illustrating a method 1700 that supports subcarrier mapping techniques for GI-based OFDM communications in accordance with aspects of the present disclosure. The operations of the method 1700 may be implemented by a UE or a base station or its components as described herein. For example, the operations of the method 1700 may be performed by a UE 115 as described with reference to FIGS. 1 through 12 or a base station 105 as described with reference to FIGS. 1 through 8 and 13 through 16. In some examples, a UE or a base station may execute a set of instructions to control the functional elements of the UE or the base station to perform the described functions. Additionally or alternatively, the UE or the base station may perform aspects of the described functions using special-purpose hardware.

Optionally, at 1705, the method may include receiving, from a base station, configuration information that indicates the permutation matrix is to be used to generate the OFDM symbol that includes the first set of time-domain GI samples. The operations of 1705 may be performed in accordance with examples as disclosed herein. In some examples, aspects of the operations of 1705 may be performed by a configuration manager 1145 or a configuration manager 1540 as described with reference to FIGS. 11 and 15. In some cases, one or more parameters for determination of the permutation matrix may be received via RRC signaling, a MAC-CE, DCI, or any combinations thereof.

At 1710, the method may include identifying a first set of GI inputs and a second set of data inputs for an OFDM communication, where the OFDM communication has a first set of time-domain GI samples and a second set of time-domain data samples. The operations of 1710 may be performed in accordance with examples as disclosed herein. In some examples, aspects of the operations of 1710 may be performed by a GI sequence manager 1125 or a GI sequence manager 1525 as described with reference to FIGS. 11 and 15.

Optionally, at 1715, the method may include performing a QR decomposition with column pivoting on a sub-matrix of a first matrix to determine an ordered set of columns that are ordered according to linear independence, where the first matrix is based at least in part on an IFFT matrix that is used to generate an OFDM symbol of the OFDM communication, and a first number of columns correspond to a number of subcarriers that carry the first set of time-domain GI samples. The operations of 1715 may be performed in accordance with examples as disclosed herein. In some examples, aspects of the operations of 1715 may be performed by a permutation matrix manager 1130 or a permutation matrix manager 1530 as described with reference to FIGS. 11 and 15.

Optionally, at 1720, the method may include selecting the first number of columns from the ordered set of columns. The operations of 1720 may be performed in accordance with examples as disclosed herein. In some examples, aspects of the operations of 1720 may be performed by a permutation matrix manager 1130 or a permutation matrix manager 1530 as described with reference to FIGS. 11 and 15.

At 1725, the method may include determining a permutation matrix to map the first set of GI inputs to a subset of a set of subcarriers for the OFDM communication, the permutation matrix determined based on the first number of columns of the sub-matrix of the first matrix, where the first number of columns correspond to a number of subcarriers that carry the first set of time-domain GI samples. The operations of 1725 may be performed in accordance with examples as disclosed herein. In some examples, aspects of the operations of 1725 may be performed by a permutation matrix manager 1130 or a permutation matrix manager 1530 as described with reference to FIGS. 11 and 15.

At 1730, the method may include generating the OFDM symbol with the first set of time-domain GI samples and the second set of time-domain data samples based on a product of the permutation matrix and the first matrix applied to the first set of GI inputs and the second set of data inputs. The operations of 1730 may be performed in accordance with examples as disclosed herein. In some examples, aspects of the operations of 1730 may be performed by an OFDM symbol manager 1135 or an OFDM symbol manager 1535 as described with reference to FIGS. 11 and 15.

At 1735, the method may include transmitting the OFDM symbol to a receiving device. The operations of 1735 may be performed in accordance with examples as disclosed herein. In some examples, aspects of the operations of 1735 may be performed by an OFDM symbol manager 1135 or an OFDM symbol manager 1535 as described with reference to FIGS. 11 and 15.

Figure 18:
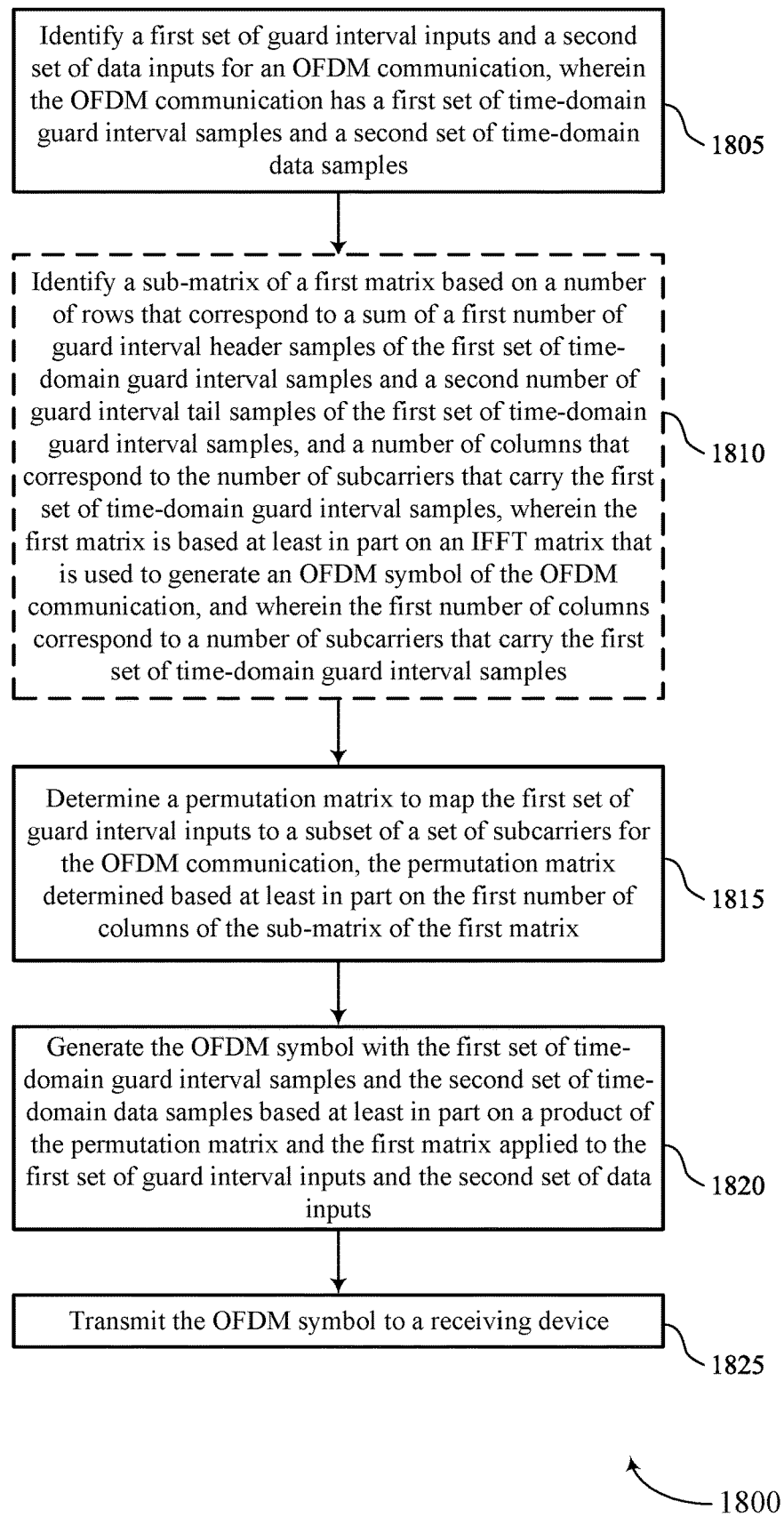

FIG. 18 shows a flowchart illustrating a method 1800 that supports subcarrier mapping techniques for GI-based OFDM communications in accordance with aspects of the present disclosure. The operations of the method 1800 may be implemented by a UE or a base station or its components as described herein. For example, the operations of the method 1800 may be performed by a UE 115 as described with reference to FIGS. 1 through 12 or a base station 105 as described with reference to FIGS. 1 through 8 and 13 through 16. In some examples, a UE or a base station may execute a set of instructions to control the functional elements of the UE or the base station to perform the described functions. Additionally or alternatively, the UE or the base station may perform aspects of the described functions using special-purpose hardware.

At 1805, the method may include identifying a first set of GI inputs and a second set of data inputs for an OFDM communication, where the OFDM communication has a first set of time-domain GI samples and a second set of time-domain data samples. The operations of 1805 may be performed in accordance with examples as disclosed herein. In some examples, aspects of the operations of 1805 may be performed by a GI sequence manager 1125 or a GI sequence manager 1525 as described with reference to FIGS. 11 and 15.

Optionally, at 1810, the method may include identifying a sub-matrix of a first matrix based on a number of rows that correspond to a sum of a first number of GI header samples of the first set of time-domain GI samples and a second number of GI tail samples of the first set of time-domain GI samples, and a number of columns that correspond to the number of subcarriers that carry the first set of time-domain GI samples, wherein the first matrix is based at least in part on an IFFT matrix that is used to generate an OFDM symbol of the OFDM communication, and wherein the first number of columns correspond to a number of subcarriers that carry the first set of time-domain GI samples. The operations of 1810 may be performed in accordance with examples as disclosed herein. In some examples, aspects of the operations of 1810 may be performed by a sub-matrix manager 1140 or a sub-matrix manager 1545 as described with reference to FIGS. 11 and 15.

At 1815, the method may include determining a permutation matrix to map the first set of GI inputs to a subset of a set of subcarriers for the OFDM communication, the permutation matrix determined based on the first number of columns of the sub-matrix of the first matrix. The operations of 1815 may be performed in accordance with examples as disclosed herein. In some examples, aspects of the operations of 1815 may be performed by a permutation matrix manager 1130 or a permutation matrix manager 1530 as described with reference to FIGS. 11 and 15.

At 1820, the method may include generating the OFDM symbol with the first set of time-domain GI samples and the second set of time-domain data samples based on a product of the permutation matrix and the first matrix applied to the first set of GI inputs and the second set of data inputs. The operations of 1820 may be performed in accordance with examples as disclosed herein. In some examples, aspects of the operations of 1820 may be performed by an OFDM symbol manager 1135 or an OFDM symbol manager 1535 as described with reference to FIGS. 11 and 15.

At 1825, the method may include transmitting the OFDM symbol to a receiving device. The operations of 1825 may be performed in accordance with examples as disclosed herein. In some examples, aspects of the operations of 1825 may be performed by an OFDM symbol manager 1135 or an OFDM symbol manager 1535 as described with reference to FIGS. 11 and 15.

Figure 19:
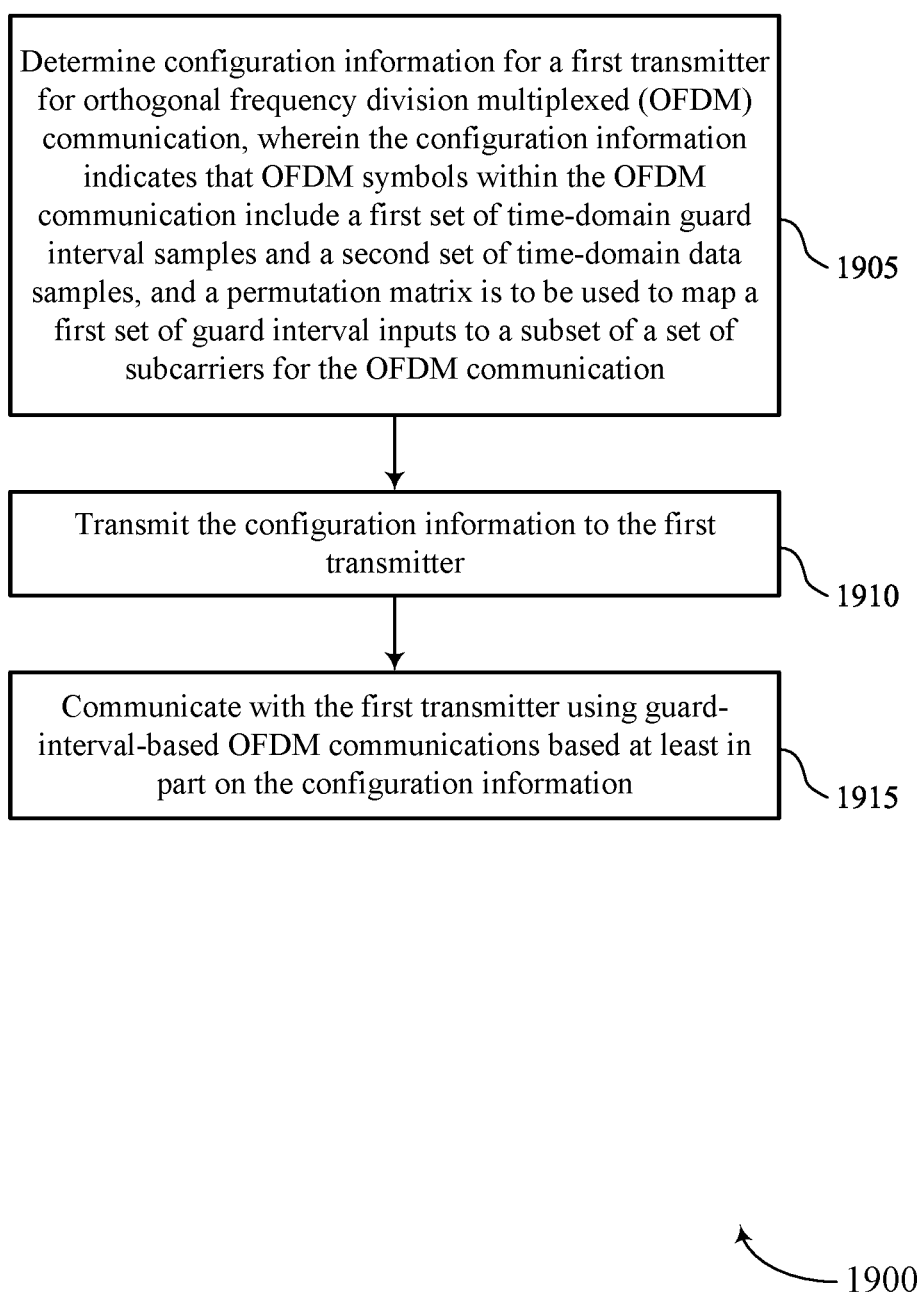

FIG. 19 shows a flowchart illustrating a method 1900 that supports subcarrier mapping techniques for GI-based OFDM communications in accordance with aspects of the present disclosure. The operations of the method 1900 may be implemented by a base station or its components as described herein. For example, the operations of the method 1900 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 1905, the method may include determining configuration information for a first transmitter for OFDM communication, where the configuration information indicates that OFDM symbols within the OFDM communication include a first set of time-domain GI samples and a second set of time-domain data samples, and a permutation matrix is to be used to map a first set of GI inputs to a subset of a set of subcarriers for the OFDM communication. The operations of 1905 may be performed in accordance with examples as disclosed herein. In some examples, aspects of the operations of 1905 may be performed by a GI sequence manager 1525 as described with reference to FIG. 15.

At 1910, the method may include transmitting the configuration information to the first transmitter. The operations of 1910 may be performed in accordance with examples as disclosed herein. In some examples, aspects of the operations of 1910 may be performed by a configuration manager 1540 as described with reference to FIG. 15.

At 1915, the method may include communicating with the first transmitter using guard-interval-based OFDM communications based on the configuration information. The operations of 1915 may be performed in accordance with examples as disclosed herein. In some examples, aspects of the operations of 1915 may be performed by an OFDM symbol manager 1535 as described with reference to FIG. 15.

The following provides an overview of aspects of the present disclosure:

Aspect 1: A method for wireless communication at a transmitting device, comprising: identifying a first set of guard interval inputs and a second set of data inputs for an OFDM communication, wherein the OFDM communication has a first set of time-domain guard interval samples and a second set of time-domain data samples; determining a permutation matrix to map the first set of guard interval inputs to a subset of a set of subcarriers for the OFDM communication, the permutation matrix determined based at least in part on a first number of columns of a sub-matrix of a first matrix, wherein the first matrix is based at least in part on an IFFT matrix that is used to generate an OFDM symbol of the OFDM communication, and wherein the first number of columns correspond to a number of subcarriers that carry the first set of time-domain guard interval samples; generating the OFDM symbol with the first set of time-domain guard interval samples and the second set of time-domain data samples based at least in part on a product of the permutation matrix and the first matrix applied to the first set of guard interval inputs and the second set of data inputs; and transmitting the OFDM symbol to a receiving device.

Aspect 2: The method of aspect 1, further comprising: identifying the sub-matrix of the first matrix based on a number of rows that correspond to a sum of a first number of guard interval header samples of the first set of time-domain guard interval samples and a second number of guard interval tail samples of the first set of time-domain guard interval samples, and a number of columns that correspond to the number of subcarriers that carry the first set of time-domain guard interval samples.

Aspect 3: The method of any of aspects 1 through 2, wherein the IFFT matrix has a length that corresponds to a sum of a first number of time-domain guard interval samples of the first set of time-domain guard interval samples and a second number of time-domain data samples of the second set of time-domain data samples.

Aspect 4: The method of any of aspects 1 through 3, further comprising: receiving, from a base station, configuration information that indicates the permutation matrix is to be used to generate the OFDM symbol that includes the first set of time-domain guard interval samples.

Aspect 5: The method of aspect 4, wherein the permutation matrix is determined based at least in part on one or more parameters that are specified, that are included with the configuration information, that are determined based at least in part on one or more conditions associated with the OFDM symbol, or any combinations thereof.

Aspect 6: The method of any of aspects 4 through 5, wherein the receiving the configuration information further comprises: receiving one or more parameters for determination of the permutation matrix via RRC signaling, a medium access control (MAC) control element, DCI, or any combinations thereof.

Aspect 7: The method of any of aspects 1 through 6, wherein the first number of columns of the sub-matrix are selected as quasi-equidistant columns from a total number of columns of the first matrix.

Aspect 8: The method of aspect 7, wherein the first matrix is a product of the IFFT matrix and a sub-carrier mapping matrix, and the sub-matrix includes columns of the first matrix that correspond to a subset of active subcarriers for the OFDM symbol that do not include guard subcarriers associated with a guard band of the OFDM symbol.

Aspect 9: The method of any of aspects 7 through 8, wherein the first matrix corresponds to the IFFT matrix, and the sub-matrix includes columns of the first matrix that correspond to all subcarriers for the OFDM symbol including guard subcarriers associated with a guard band of the OFDM symbol, and one or more columns of the sub-matrix that are associated with the guard subcarriers are discarded.

Aspect 10: The method of any of aspects 1 through 6, wherein the determining the permutation matrix comprises: performing a QR decomposition with column pivoting on the sub-matrix to determine an ordered set of columns that are ordered according to linear independence; and selecting the first number of columns from the ordered set of columns.

Aspect 11: The method of aspect 10, wherein the first matrix is a product of the IFFT matrix and a sub-carrier mapping matrix, and the first number of columns are selected in sequential order from an initial column of the ordered set of columns.

Aspect 12: The method of any of aspects 10 through 11, wherein the first matrix corresponds to the IFFT matrix and a first subset of columns of the ordered set of columns are associated with one or more guard subcarriers for the OFDM symbol, and a second subset of columns of the ordered set of columns are associated with one or more non-guard subcarriers for the OFDM symbol, and wherein the first number of columns are selected in sequential order from the second subset of columns.

Aspect 13: A method for wireless communication at a base station, comprising: determining configuration information for a first transmitter for OFDM communication, wherein the configuration information indicates that OFDM symbols within the OFDM communication include a first set of time-domain guard interval samples and a second set of time-domain data samples, and a permutation matrix is to be used to map a first set of guard interval inputs to a subset of a set of subcarriers for the OFDM communication; transmitting the configuration information to the first transmitter; and communicating with the first transmitter using guard-interval-based OFDM communications based at least in part on the configuration information.

Aspect 14: The method of aspect 13, wherein one or more parameters for generating the permutation matrix are specified, are transmitted in the configuration information, are implicitly derived based on conditions associated with the OFDM communication, or any combinations thereof.

Aspect 15: The method of aspect 14, wherein the one or more parameters for generating the permutation matrix are provided in RRC signaling, in a MAC control element, in DCI, or any combinations thereof.

Aspect 16: The method of any of aspects 13 through 15, wherein the permutation matrix is based at least in part on a first number of columns of a sub-matrix of a first matrix, wherein the first matrix is based at least in part on an IFFT matrix that is used to generate an OFDM symbol of the OFDM communication, and wherein the first number of columns correspond to a number of subcarriers that carry the first set of time-domain guard interval samples.

Aspect 17: The method of aspect 16, wherein the first number of columns of the sub-matrix are selected as quasi-equidistant columns from a total number of columns of the first matrix.

Aspect 18: The method of aspect 17, wherein the first matrix is a product of the IFFT matrix and a sub-carrier mapping matrix, and the sub-matrix includes columns of the first matrix that correspond to a subset of active subcarriers for the OFDM symbol that do not include guard subcarriers associated with a guard band of the OFDM symbol.

Aspect 19: The method of any of aspects 17 through 18, wherein the first matrix corresponds to the IFFT matrix, and the sub-matrix includes columns of the first matrix that correspond to all subcarriers for the OFDM symbol including guard subcarriers associated with a guard band of the OFDM symbol, and one or more columns of the sub-matrix that are associated with the guard subcarriers are discarded.

Aspect 20: The method of aspect 16, wherein the first number of columns of the sub-matrix are selected by performing a QR decomposition with column pivoting on the sub-matrix to determine an ordered set of columns that are ordered according to linear independence, and selecting the first number of columns from the ordered set of columns.

Aspect 21: The method of aspect 20, wherein the first matrix is a product of the IFFT matrix and a sub-carrier mapping matrix, and the first number of columns are selected in sequential order from an initial column of the ordered set of columns.

Aspect 22: The method of any of aspects 20 through 21, wherein the first matrix corresponds to the IFFT matrix and a first subset of columns of the ordered set of columns are associated with one or more guard subcarriers for the OFDM symbol, and a second subset of columns of the ordered set of columns are associated with one or more non-guard subcarriers for the OFDM symbol, and wherein the first number of columns are selected in sequential order from the second subset of columns.

Aspect 23: An apparatus for wireless communication at a transmitting device, comprising a processor; memory coupled with the processor; and instructions stored in the memory and executable by the processor to cause the apparatus to perform a method of any of aspects 1 through 12.

Aspect 24: An apparatus for wireless communication at a transmitting device, comprising at least one means for performing a method of any of aspects 1 through 12.

Aspect 25: A non-transitory computer-readable medium storing code for wireless communication at a transmitting device, the code comprising instructions executable by a processor to perform a method of any of aspects 1 through 12.

Aspect 26: An apparatus for wireless communication at a base station, comprising a processor; memory coupled with the processor; and instructions stored in the memory and executable by the processor to cause the apparatus to perform a method of any of aspects 13 through 22.

Aspect 27: An apparatus for wireless communication at a base station, comprising at least one means for performing a method of any of aspects 13 through 22.

Aspect 28: A non-transitory computer-readable medium storing code for wireless communication at a base station, the code comprising instructions executable by a processor to perform a method of any of aspects 13 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a transmitting device, comprising:
   identifying a first set of guard interval inputs and a second set of data inputs for an orthogonal frequency division multiplexed (OFDM) communication, wherein the OFDM communication has a first set of time-domain guard interval samples and a second set of time-domain data samples;
   determining a permutation matrix to map the first set of guard interval inputs to a subset of a set of subcarriers for the OFDM communication, the permutation matrix determined based at least in part on a first number of columns of a sub-matrix of a first matrix, wherein the first matrix is based at least in part on an inverse fast Fourier transform (IFFT) matrix that is used to generate an OFDM symbol of the OFDM communication, and wherein the first number of columns correspond to a number of subcarriers that carry the first set of time-domain guard interval samples;
   generating the OFDM symbol with the first set of time-domain guard interval samples and the second set of time-domain data samples based at least in part on a product of the permutation matrix and the first matrix applied to the first set of guard interval inputs and the second set of data inputs; and
   transmitting the OFDM symbol to a receiving device.

2. The method of claim 1, further comprising:
   identifying the sub-matrix of the first matrix based on a number of rows that correspond to a sum of a first number of guard interval header samples of the first set of time-domain guard interval samples and a second number of guard interval tail samples of the first set of time-domain guard interval samples, and a number of columns that correspond to the number of subcarriers that carry the first set of time-domain guard interval samples.

3. The method of claim 1, wherein the IFFT matrix has a length that corresponds to a sum of a first number of time-domain guard interval samples of the first set of time-domain guard interval samples and a second number of time-domain data samples of the second set of time-domain data samples.

4. The method of claim 1, further comprising:
receiving configuration information that indicates the permutation matrix is to be used to generate the OFDM symbol that includes the first set of time-domain guard interval samples.

5. The method of claim 4, wherein the permutation matrix is determined based at least in part on one or more parameters that are specified, that are included with the configuration information, that are determined based at least in part on one or more conditions associated with the OFDM symbol, or any combinations thereof.

6. The method of claim 4, wherein the receiving the configuration information further comprises:
receiving one or more parameters for determination of the permutation matrix via radio resource control (RRC) signaling, a medium access control (MAC) control element, downlink control information (DCI), or any combinations thereof.

7. The method of claim 1, wherein the first number of columns of the sub-matrix are selected as quasi-equidistant columns from a total number of columns of the first matrix.

8. The method of claim 7, wherein the first matrix is a product of the IFFT matrix and a sub-carrier mapping matrix, and the sub-matrix includes columns of the first matrix that correspond to a subset of active subcarriers for the OFDM symbol that do not include guard subcarriers associated with a guard band of the OFDM symbol.

9. The method of claim 7, wherein the first matrix corresponds to the IFFT matrix, and the sub-matrix includes columns of the first matrix that correspond to all subcarriers for the OFDM symbol including guard subcarriers associated with a guard band of the OFDM symbol, and one or more columns of the sub-matrix that are associated with the guard subcarriers are discarded.

10. The method of claim 1, wherein the determining the permutation matrix comprises:
performing a QR decomposition with column pivoting on the sub-matrix to determine an ordered set of columns that are ordered according to linear independence; and
selecting the first number of columns from the ordered set of columns.

11. The method of claim 10, wherein the first matrix is a product of the IFFT matrix and a sub-carrier mapping matrix, and the first number of columns are selected in sequential order from an initial column of the ordered set of columns.

12. The method of claim 10, wherein the first matrix corresponds to the IFFT matrix and a first subset of columns of the ordered set of columns are associated with one or more guard subcarriers for the OFDM symbol, and a second subset of columns of the ordered set of columns are associated with one or more non-guard subcarriers for the OFDM symbol, and wherein the first number of columns are selected in sequential order from the second subset of columns.

13. A method for wireless communication at an access network entity, comprising:
determining configuration information for a first transmitter for orthogonal frequency division multiplexed (OFDM) communication, wherein the configuration information indicates that OFDM symbols within the OFDM communication include a first set of time-domain guard interval samples and a second set of time-domain data samples, and a permutation matrix is to be used to map a first set of guard interval inputs to a subset of a set of subcarriers for the OFDM communication, wherein the permutation matrix is based at least in part on a first number of columns of a sub-matrix of a first matrix, wherein the first matrix is based at least in part on an inverse fast Fourier transform (IFFT) matrix that is used to generate an OFDM symbol of the OFDM communication, and wherein the first number of columns correspond to a number of subcarriers that carry the first set of time-domain guard interval samples;
transmitting the configuration information to the first transmitter; and
communicating with the first transmitter using guard-interval-based OFDM communications based at least in part on the configuration information.

14. The method of claim 13, wherein one or more parameters for generating the permutation matrix are specified, are transmitted in the configuration information, are implicitly derived based on conditions associated with the OFDM communication, or any combinations thereof.

15. The method of claim 14, wherein the one or more parameters for generating the permutation matrix are provided in radio resource control (RRC) signaling, in a medium access control (MAC) control element, in downlink control information (DCI), or any combinations thereof.

16. The method of claim 13, wherein the first number of columns of the sub-matrix are selected as quasi-equidistant columns from a total number of columns of the first matrix.

17. The method of claim 16, wherein the first matrix is a product of the IFFT matrix and a sub-carrier mapping matrix, and the sub-matrix includes columns of the first matrix that correspond to a subset of active subcarriers for the OFDM symbol that do not include guard subcarriers associated with a guard band of the OFDM symbol.

18. The method of claim 16, wherein the first matrix corresponds to the IFFT matrix, and the sub-matrix includes columns of the first matrix that correspond to all subcarriers for the OFDM symbol including guard subcarriers associated with a guard band of the OFDM symbol, and one or more columns of the sub-matrix that are associated with the guard subcarriers are discarded.

19. The method of claim 13, wherein the first number of columns of the sub-matrix are selected by performing a QR decomposition with column pivoting on the sub-matrix to determine an ordered set of columns that are ordered according to linear independence, and selecting the first number of columns from the ordered set of columns.

20. The method of claim 19, wherein the first matrix is a product of the IFFT matrix and a sub-carrier mapping matrix, and the first number of columns are selected in sequential order from an initial column of the ordered set of columns.

21. The method of claim 19, wherein the first matrix corresponds to the IFFT matrix and a first subset of columns of the ordered set of columns are associated with one or more guard subcarriers for the OFDM symbol, and a second subset of columns of the ordered set of columns are associated with one or more non-guard subcarriers for the OFDM symbol, and wherein the first number of columns are selected in sequential order from the second subset of columns.

22. An apparatus for wireless communication at a transmitting device, comprising:
   a processor;
   memory coupled with the processor; and
   instructions stored in the memory and executable by the processor to cause the apparatus to:
      identify a first set of guard interval inputs and a second set of data inputs for an orthogonal frequency division multiplexed (OFDM) communication, wherein the OFDM communication has a first set of time-domain guard interval samples and a second set of time-domain data samples;
      determine a permutation matrix to map the first set of guard interval inputs to a subset of a set of subcarriers for the OFDM communication, the permutation matrix determined based at least in part on a first number of columns of a sub-matrix of a first matrix, wherein the first matrix is based at least in part on an inverse fast Fourier transform (IFFT) matrix that is used to generate an OFDM symbol of the OFDM communication, and wherein the first number of columns correspond to a number of subcarriers that carry the first set of time-domain guard interval samples;
      generate the OFDM symbol with the first set of time-domain guard interval samples and the second set of time-domain data samples based at least in part on a product of the permutation matrix and the first matrix applied to the first set of guard interval inputs and the second set of data inputs; and
      transmit the OFDM symbol to a receiving device.

23. The apparatus of claim 22, wherein the instructions are further executable by the processor to cause the apparatus to:
   identify the sub-matrix of the first matrix based on a number of rows that correspond to a sum of a first number of guard interval header samples of the first set of time-domain guard interval samples and a second number of guard interval tail samples of the first set of time-domain guard interval samples, and a number of columns that correspond to the number of subcarriers that carry the first set of time-domain guard interval samples.

24. The apparatus of claim 22, wherein the IFFT matrix has a length that corresponds to a sum of a first number of time-domain guard interval samples of the first set of time-domain guard interval samples and a second number of time-domain data samples of the second set of time-domain data samples.

25. The apparatus of claim 22, wherein the instructions are further executable by the processor to cause the apparatus to:
   receive configuration information that indicates the permutation matrix is to be used to generate the OFDM symbol that includes the first set of time-domain guard interval samples.

26. An apparatus for wireless communication at an access network entity, comprising:
   a processor;
   memory coupled with the processor; and
   instructions stored in the memory and executable by the processor to cause the apparatus to:
      determine configuration information for a first transmitter for orthogonal frequency division multiplexed (OFDM) communication, wherein the configuration information indicates that OFDM symbols within the OFDM communication include a first set of time-domain guard interval samples and a second set of time-domain data samples, and a permutation matrix is to be used to map a first set of guard interval inputs to a subset of a set of subcarriers for the OFDM communication, wherein the permutation matrix is based at least in part on a first number of columns of a sub-matrix of a first matrix, wherein the first matrix is based at least in part on an inverse fast Fourier transform (IFFT) matrix that is used to generate an OFDM symbol of the OFDM communication, and wherein the first number of columns correspond to a number of subcarriers that carry the first set of time-domain guard interval samples;
      transmit the configuration information to the first transmitter; and
      communicate with the first transmitter using guard-interval-based OFDM communications based at least in part on the configuration information.

27. The apparatus of claim 26, wherein one or more parameters for generating the permutation matrix are specified, are transmitted in the configuration information, are implicitly derived based on conditions associated with the OFDM communication, or any combinations thereof.

28. The apparatus of claim 27, wherein the one or more parameters for generating the permutation matrix are provided in radio resource control (RRC) signaling, in a medium access control (MAC) control element, in downlink control information (DCI), or any combinations thereof.

* * * * *